US012053898B2

(12) United States Patent
Venturini et al.

(10) Patent No.: US 12,053,898 B2
(45) Date of Patent: Aug. 6, 2024

(54) KNIFE FOR MAKING INCISIONS ON CAPS

(71) Applicant: SACMI COOPERATIVA MECCANICI IMOLA SOCIETA' COOPERATIVA, Imola (IT)

(72) Inventors: Matteo Venturini, Imola (IT); Davide Penazzi, Imola (IT)

(73) Assignee: SACMI COOPERATIVA MECCANICI IMOLA SOCIETA' COOPERATIVA (IT)

( * ) Notice: Subject to any disclaimer, the term of this patent is extended or adjusted under 35 U.S.C. 154(b) by 0 days.

(21) Appl. No.: 17/859,060

(22) Filed: Jul. 7, 2022

(65) Prior Publication Data

US 2023/0012277 A1 Jan. 12, 2023

(30) Foreign Application Priority Data

Jul. 7, 2021 (IT) ........................ 102021000017933

(51) Int. Cl.

*B26D 1/00* (2006.01)
*B26D 1/02* (2006.01)
*B26D 3/08* (2006.01)

(52) U.S. Cl.

CPC ............. *B26D 1/0006* (2013.01); *B26D 1/02* (2013.01); *B26D 3/08* (2013.01); *B26D 2001/0033* (2013.01); *B26D 2001/004* (2013.01); *B26D 2001/0053* (2013.01)

(58) Field of Classification Search

CPC ... B26F 1/22; B65D 2401/35; B65D 41/3428; B26D 1/03; B26D 1/0006; B26D 7/06; B26D 2001/0033

See application file for complete search history.

(56) References Cited

U.S. PATENT DOCUMENTS

2021/0094736 A1* 4/2021 Maguire ................ B65D 55/16

FOREIGN PATENT DOCUMENTS

| | | | |
|---|---|---|---|
| DE | 202019104298 | U1 | 11/2020 |
| WO | 2004004993 | A1 | 1/2004 |
| WO | 2021186403 | A1 | 9/2021 |

* cited by examiner

*Primary Examiner* — Jennifer S Matthews
(74) *Attorney, Agent, or Firm* — Laubscher & Fretwell, P.C.

(57) ABSTRACT

A knife in a cutting apparatus for obtaining incision lines and notches on a cap made of plastics intended for closing a container, the knife being suitable for making notches and incisions on a side wall of the cap when the cap rotates around a rotation axis and moves along a path for interacting with the knife in an advancement direction, the knife including a plurality of tools arranged in a layered structure, wherein the cutting tools are parallel to a plane and stacked in a direction of a vertical axis orthogonal to the plane, the layered structure including: a first horizontal cutting tool, a second horizontal cutting tool, and a transverse cutting tool including at least two transverse cutting edges, each extending substantially vertically.

19 Claims, 19 Drawing Sheets

KNIFE FOR MAKING INCISIONS ON CAPS

CROSS-REFERENCE TO RELATED APPLICATIONS

This application claims priority from Italian Patent Application No. IT-102021000017933 filed Jul. 7, 2021. The entire content of this application is incorporated herein by reference.

BACKGROUND OF THE INVENTION

The invention relates to a knife for making incisions on caps or closures or plastic stoppers of the type used for closing containers such as bottles. In particular, the invention relates to a knife arranged for cutting the side wall of a cap, so as to obtain on such side wall a tamperproof band or ring and one or more connection portions, also known as straps or hinges, which connect the tamperproof band or ring to a different portion of the cap, for instance to the main body of the cap, i.e. to a portion of the side wall having a closed end of the cap.

The knife is also arranged for cutting the side wall of the cap so as to obtain, on the main body of the cap, a tab, i.e. a portion of the main body shaped so as to keep the closure in a pre-set position relative to the tamperproof ring, after the container has been opened, so as to ease access to the container by a user.

The design of articles made of plastic material is increasingly more oriented towards recyclable materials and recycling articles after use. Due to this, even in the field of closures for containers, closures provided with straps, which enable to retain the closure on its own tamperproof ring even following the opening of the container, are increasingly more requested.

In use, when a stopper provided with a tamperproof band and straps is applied to a container mouthpiece, such as a bottle, for closing the container, the tamperproof band is placed in a seat generally defined between two annular protrusions, which the container body is provided with, that limit the axial movements of the tamperproof ring. By unscrewing the closure, the container is opened, the tamperproof band is kept in its seat and the straps keep the cap joined to the tamperproof ring, and thus to the bottle, even after the closed end portion of the closure has been moved away from the container mouthpiece. The tab is in particular shaped to keep the closed end portion of the closure in a position, in particular in a position overturned with respect to the tamperproof ring or to the container mouthpiece, such to make the container mouthpiece easily accessible to a user.

This contributes to an effective recycling of plastic, as the tamperproof ring may be separated from the bottle together with the closure at the same time, namely when the closure plastic material is intended to be recycled. Furthermore, keeping the closure connected to the tamperproof ring even after the container has been opened helps preventing the cap from being dispersed into the environment.

The straps on the side wall of a cap are mainly obtained according to two types of processing: by forming, i.e. providing duly shaped moulds for forming straps; or by cutting, i.e. providing a cut or incision arrangement on the side wall of the cap already formed. Cuts and incisions determine side wall parts that are partially detachable from the remaining side wall of the cap, such side wall parts defining the connection portions or straps in addition to the tamperproof ring and the tab. Techniques for producing straps combining particular mould shapes for forming the cap and predetermined shapes of notches obtained on the caps after forming are also known.

They are known cutting devices including blades suitable for cutting or making incisions on a cap in the side wall thereof in order to determine a circumferential weakening and preferential separation line between the tamperproof band and a remaining part of the side wall of the cap, i.e. of the main body. This type of cut is also known as horizontal cut.

They are also known cutting devices suitable for cutting and making incisions, in one or more points or zones, on a side wall of the cap according to a direction substantially parallel to the axis of the cap, in order to obtain, for example, weakening zones in the tamperproof band. This type of cut is also known as vertical cut.

They are also known cutting devices adapted to make incisions on a side wall both by a horizontal cut and a vertical cut in a radial position of the cap. These last cutting devices generally include a knife for horizontal cut, downstream of which an insert provided with a vertical blade is positioned to make incisions on the cap by a vertical cut.

They are also known cutting devices having knives which include a variety of blades to obtain the connection portions or straps and a tab.

The different cutting devices described above are provided with knives manufactured for specific cutting geometries and for specific cap sizes. This means that the cap manufacturer has to find and keep stored several knives which the cutting device is to be equipped with any time that the cap production batch has to be changed. Furthermore, equipping the cutting device with a new knife requires a certain downtime, thus resulting in high production costs. Furthermore, the knives used to obtain the straps are structurally complex, requiring a large number of parts, such as blades, to be replaced once worn, thereby manufacturing caps with such complex structures increases production costs.

The structural complexity of the known knives makes it difficult and little efficient to sharpen knives, as the latter ones are hardly accessible due to the small knife dimensions. This increases maintenance time and contributes to an uneven sharpening of the blades.

SUMMARY OF THE INVENTION

An object of the invention is to improve the prior art knives for apparatuses for cutting caps.

Another object of the invention is to provide an alternative solution for making incisions on caps.

A further object of the invention is to provide a knife for an apparatus for cutting caps that makes incisions of straps or other elements such as tabs on side walls of plastic caps and that has a relatively simple structure.

According to the invention, it is provided a knife as defined by the enclosed claims.

Thanks to the invention it is possible to provide a multi-layered knife which makes incisions having a more or less complex geometry by means of cutting profiles arranged according to different tilts.

Thanks to the invention it is possible to provide a knife whose blades may be effectively sharpened.

Thanks to the invention it is possible to provide a knife that is robust, compact and stable in use.

BRIEF DESCRIPTION OF THE DRAWINGS

The invention shall be better understood and implemented referring to the appended drawings which show some exemplary and non-limiting embodiments thereof, wherein.

DETAILED DESCRIPTION

Figure 1:
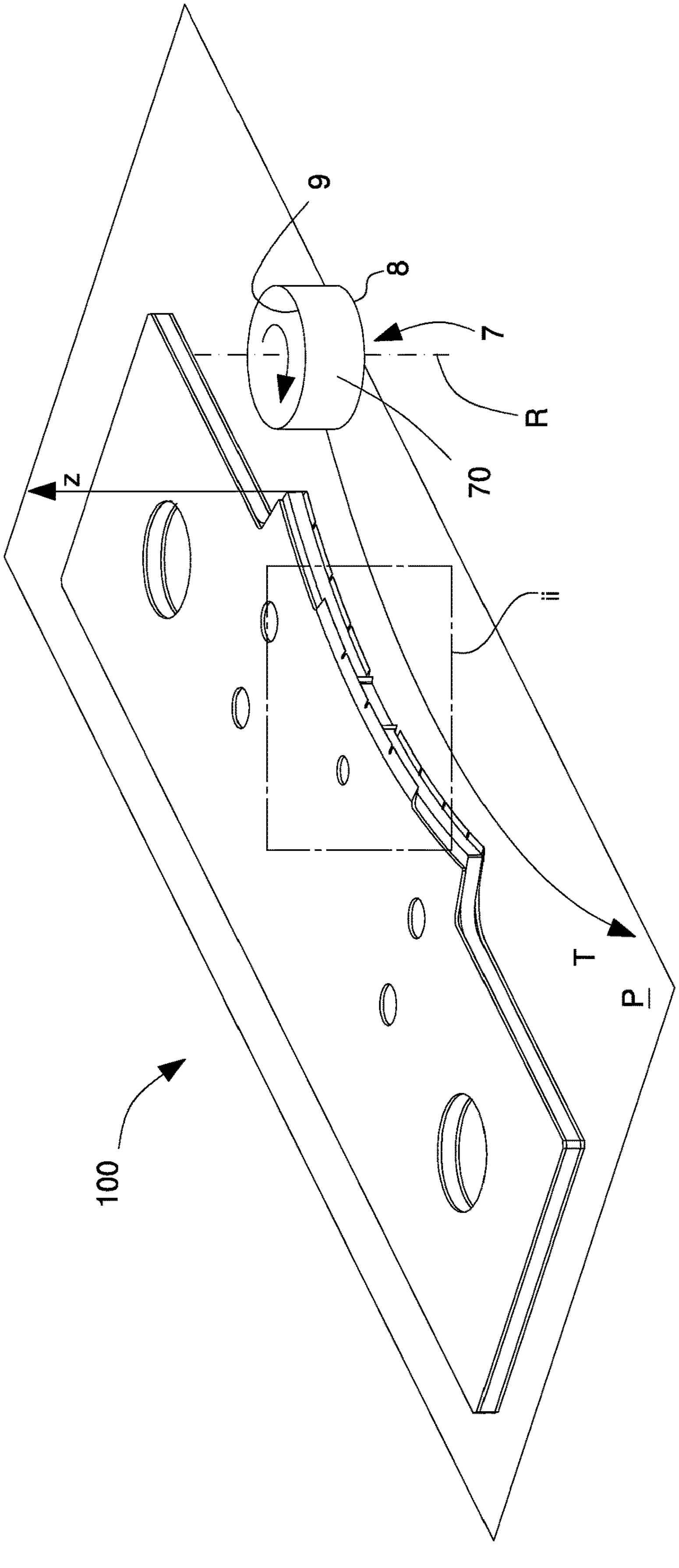
FIG. 1 is a perspective view of a first embodiment of a knife for cutting caps.

Referring to FIGS. 1-13, a first embodiment of a knife for making incisions on caps or stoppers or closures, i.e. a knife 100 arranged for cutting or making incisions on a side wall 70 of a cap 7 is disclosed. The cap 7 is made of plastic material and is intended to close a container, such as a bottle. The cap 7 has a cup-shaped main body 71 and is provided with a closed end 8 and an open end 9.

The knife 100 is arranged to be fitted in a cutting apparatus to obtain incision lines and notches on the cap 7.

The word "cut" or "notch" means a zone of the cap 7 provided with a piercing cut, i.e. a through slot where the material continuity has been interrupted by the action of the knife. The word "incision" means a zone of the cap 7 wherein the side wall 70 has a small thickness caused by a knife penetrating the material up to a given depth without interrupting the material continuity. On the basis of the thickness of the cap wall, an equal action of the knife, i.e. an equal depth of penetration of the knife may create a cut where the penetration depth is equal to or greater than the thickness of the wall or an incision where the same depth of penetration is smaller than the thickness of the wall.

The knife 100 includes a cutting portion 60 to interact with a wall of the cap 7 to produce notches or incisions thereon. In particular, the knife 100 includes a plurality of cutting tools. The knife 100 has a layered structure wherein the cutting tools of the plurality of cutting tools are stacked. The layered structure defines a cutting portion of the knife 100, hereinafter referred to as an arrangement of cutting edges 60. In the present disclosure, arrangement of cutting edges means an arrangement or assembly of cutting edges of different shape and size which the knife is provided with, making it possible for the knife to perform cuts and/or incisions on the cap 7 when the knife 100 is fitted in a cutting apparatus for making incisions and notches on caps.

Referring to FIGS. 14-27, a second embodiment of the knife, i.e. a knife 100', is shown. The knife 100' has a layered structure wherein the cutting edges have a different arrangement compared to those of the knife 100. Such a structure defines a further cutting portion of the knife 100', i.e. a further arrangement of cutting edges 60'.

Figure 12:
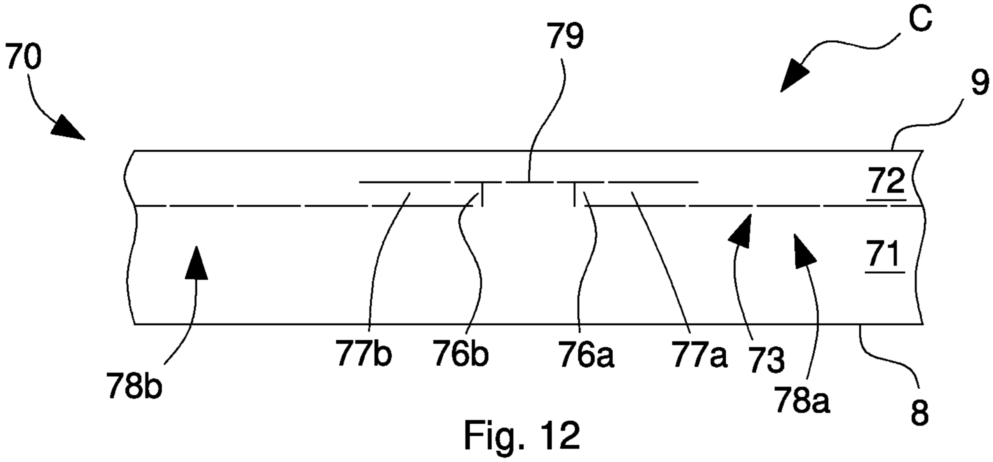
FIG. 12 is a cylindrical projection view of a side wall of a cap cut by the knife of FIG. 1, in a closing configuration of the cap.
Figure 13:
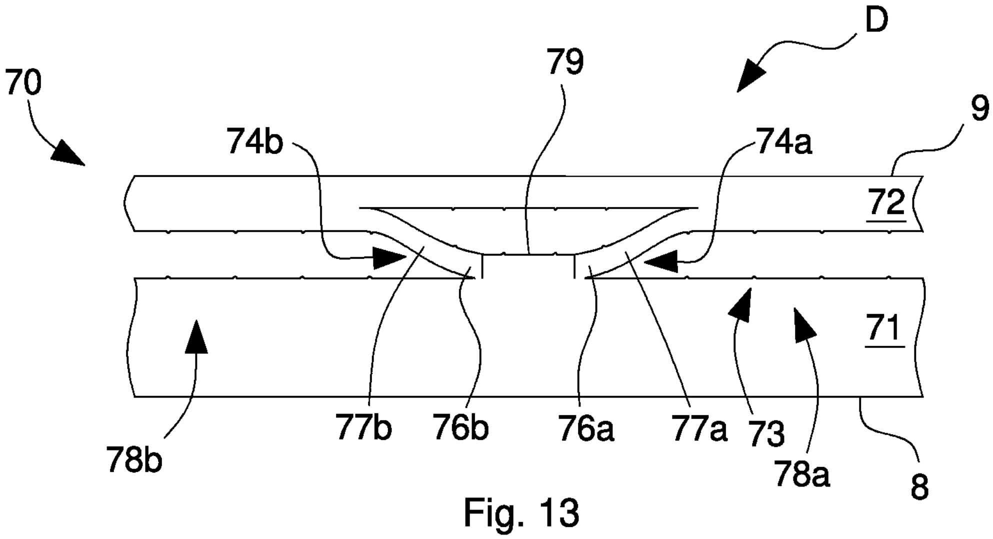
FIG. 13 is a cylindrical projection view of a side wall of a cap cut by the knife of FIG. 1, in an opening configuration of the cap.
Figure 26:
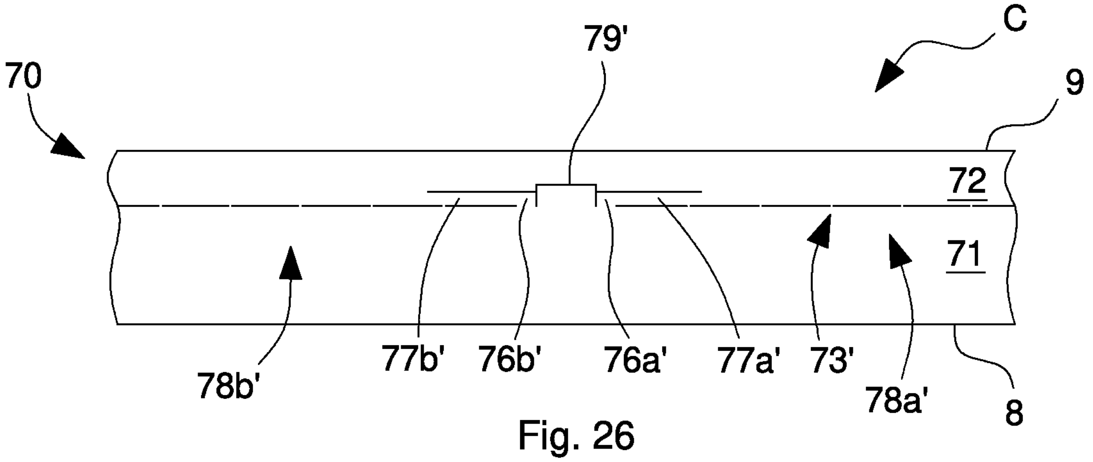
FIG. 26 is a cylindrical projection view of a side wall of a cap cut by the knife of FIG. 14, in a closing configuration of the cap.
Figure 27:
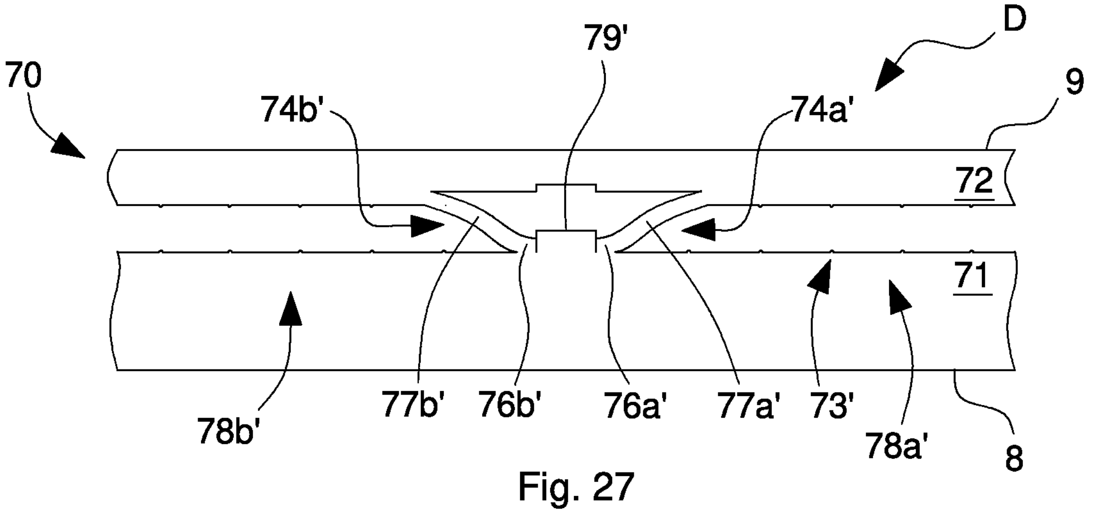
FIG. 27 is a cylindrical projection view of a side wall of a cap cut by the knife of FIG. 14, in an opening configuration of the cap.

The knife 100, 100' is suitable for forming a tamperproof band or ring 72 in the cap 7 (FIGS. 12, 13, 26, 27). The knife 100, 100' is suitable for forming connection portions 74*a*, 74*b*, 74*a*', 74*b*' between the tamperproof ring 72 and the main body 71. By means of the connection portions 74*a*, 74*b*, 74*a*', 74*b*' the main body 71 of the cap 7 remains linked to the tamperproof ring 72 even when the cap 7 is removed from a container mouth on which it had been applied to open the container and have access to the content, i.e. when the cap is in an opening configuration D (FIGS. 13, 27).

The knife 100, 100' is also suitable for forming tab portions 79, 79' in the side wall 70 on the main body 71 of the cap 7. The tab portions 79, 79' allow to hold the main body 71 of the cap 7 in an overturned position on the container mouth. When the cap is in the opening configuration D, given the presence of the straps 74*a*, 74*b*, 74*a*', 74*b*' connecting the tamperproof ring 72 and the main body 71, the main body 71 remains lifted near the container mouth hindering the container mouth despite being detached therefrom; in order to clear the container mouth from the hindrance of the main body 71 and have easy access to the container mouth on which the cap 7 was applied, it may be necessary to overturn the main body 71 with respect to the tamperproof ring 72; once the main body 71 is overturned, it is possible that, due to the elasticity of the straps, the main body 71, if not retained, returns to a configuration similar to that of the opening D. By means of the tab portion 79, 79' it is possible to hold stably the main body 71 in an overturned configuration (not shown) with respect to the tamperproof ring 72, being the tab portion 79, 79' shaped to abut on an element retaining the main body placed in particular on the tamperproof ring 72 or on the container mouth.

In use, the knife 100, 100' within the cutting apparatus cooperates with a mandrel (not shown) which grabs the cap 7 rotating it about a rotation axis R parallel to, or coincident with an axis of the cap 7; the mandrel brings the side wall 70 of the cap 7 in contact with a cutting portion 60, 60' of the knife 100, 100', moving the cap 7 along a substantially arc-of-circumference path in an advancement direction T and rotating the cap 7 of the rotation axis R, rotating the cap against the cutting portion 60, 60'. The cutting apparatus may include a mandrel-holder carousel, on which periphery the mandrels are rotatably supported, such mandrel-holder carousel is rotatable about a rotation axis thereof substantially parallel to the rotation axis R. The centre of the path (not indicated in the figures) is positioned outside the knife 100, 100' and may coincide with the revolution axis of the mandrel-holder carousel.

Depending on the arrangement of the cutting edges 60, 60' of the cutting portion of the knife 100, 100', a corresponding incision on the side wall 70 of the cap 7 is obtained. In other words, such an arrangement of cutting edges 60, 60' is obtained as a recess on the side wall 70 of the cap 7.

Figure 14:
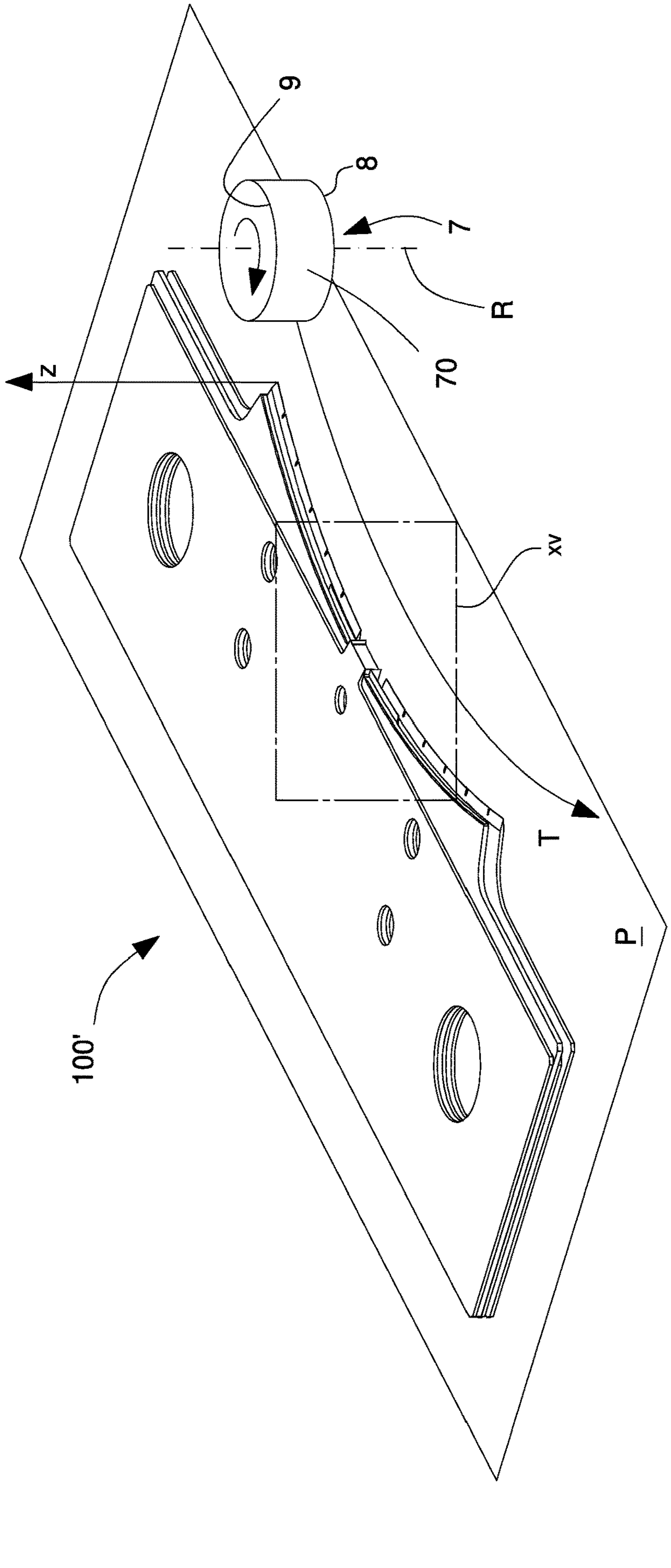
FIG. 14 is a perspective view of a second embodiment of a knife for cutting caps.

Referring in particular to FIGS. 1 and 14, it should be noted that the advancement direction T and the rotation direction R of the cap 7 are only explanatory and the action of the blade 100, 100' on the cap 7 is the same as that obtainable with both the advancement direction T and the rotation direction R inverted.

Referring to FIGS. 12, 13, and 26, 27 the arrangement of the cutting edges 60, 60' defines in the side wall 70, after the action of cutting and making incision, the main body 71 and the tamperproof band or ring 72. In this disclosure the term "main body" is associated with the portion of the side wall 70 having the closed end 8 while the phrase "tamperproof band" or "tamperproof ring" is associated with the portion of side wall 70 having the open end 9, substantially annular-shaped.

The main body 71 and the tamperproof band 72 are connected with each other by a plurality of connection portions or straps 74*a*, 74*b*, 74*a*', 74*b*' and by a plurality of bridges 73, i.e. elements made of plastic material intended to be fractured by the user when the container, on which the cap 7 is applied, is first opened, to give evidence of the tampering (or of the first opening) of the container closure.

Referring in particular to FIGS. 12 and 26, the cap 7, the side wall 70 of which is shown as laid on a representation plane, is in a closing configuration C wherein the bridges 73 are intact and contribute, with the straps 74*a*, 74*b*, 74*a*', 74*b*' to join the tamperproof band 72 to the main body 71. The closing configuration C is taken by the cap before being applied to a container or after having been applied and before the container is opened for the first time and the cap is actuated.

Referring in particular to FIGS. 13 and 27, the cap 7, the side wall 70 of which is shown as laid on a representation plane, has an opening configuration D wherein the bridges 73 are broken, the main body 71 is spaced apart from the tamperproof band 72 and the tamperproof band 72 is connected to the main body 71 (only) by the straps 74*a*, 74*b*, 74*a*', 74*b*'. The opening configuration D is taken by the cap applied to a container and after the container, from which the cap is moved away, is first opened.

The knife 100, 100' includes a plurality of cutting tools arranged in a layered structure. The cutting tools are substantially parallel, in particular parallel, to a plane P and are stacked in a vertical direction Z. The vertical axis Z is transverse, in particular orthogonal to the plane P. In use, the plane P may be substantially orthogonal to the rotation axis R.

Referring to the knife indicated by the number reference 100 (FIGS. 1-13), the layered structure includes a first horizontal cutting tool 1 arranged to make circumferential notches on the side wall 70 at a first height on the vertical axis Z to determine in use the tamperproof ring 72 and the main body 71 in the cap 7, and a second horizontal cutting tool 2 arranged to perform further circumferential notches on the side wall 70 at a second height on the vertical axis Z different from the first height. In particular, the second height is greater than the first height.

The layered structure of the knife 100 further includes a transverse cutting tool 3 arranged to perform at least a transverse notch on the side wall 70 to determine in use with the first horizontal cutting tool 1 and the second horizontal cutting tool 2 a tab portion 79 on the main body 71.

Within the framework of the invention, the terms "transverse" and "transversally" are meant with respect to the plane P. In particular, the terms "transverse" and "transversally" are to be associated with a blade and/or a cutting edge and/or a cut and/or an incision on the cap which mainly extends with any slope other than the horizontal one, such slope being related to a horizontal plane passing through the vertical axis Z and tangent to the advancement direction T.

In the knife indicated by number reference 100, the transverse cutting tool 3 is interposed between the first horizontal cutting tool 1 and the second horizontal cutting tool 2.

Figure 3:
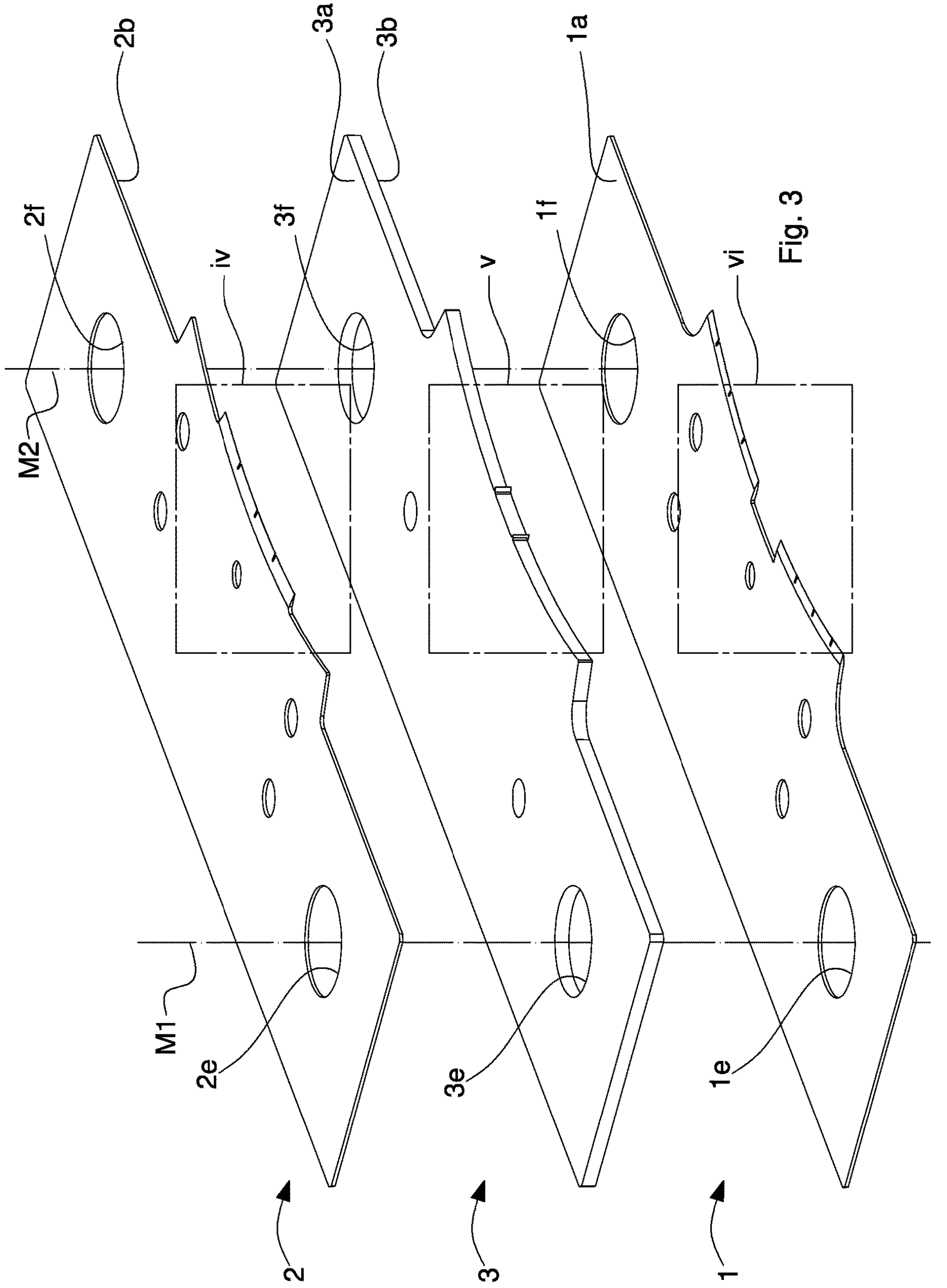
FIG. 3 is an exploded view of the knife of FIG. 1, in which a first horizontal cutting tool, a second horizontal cutting tool and a transverse cutting tool are shown.
Figure 6:
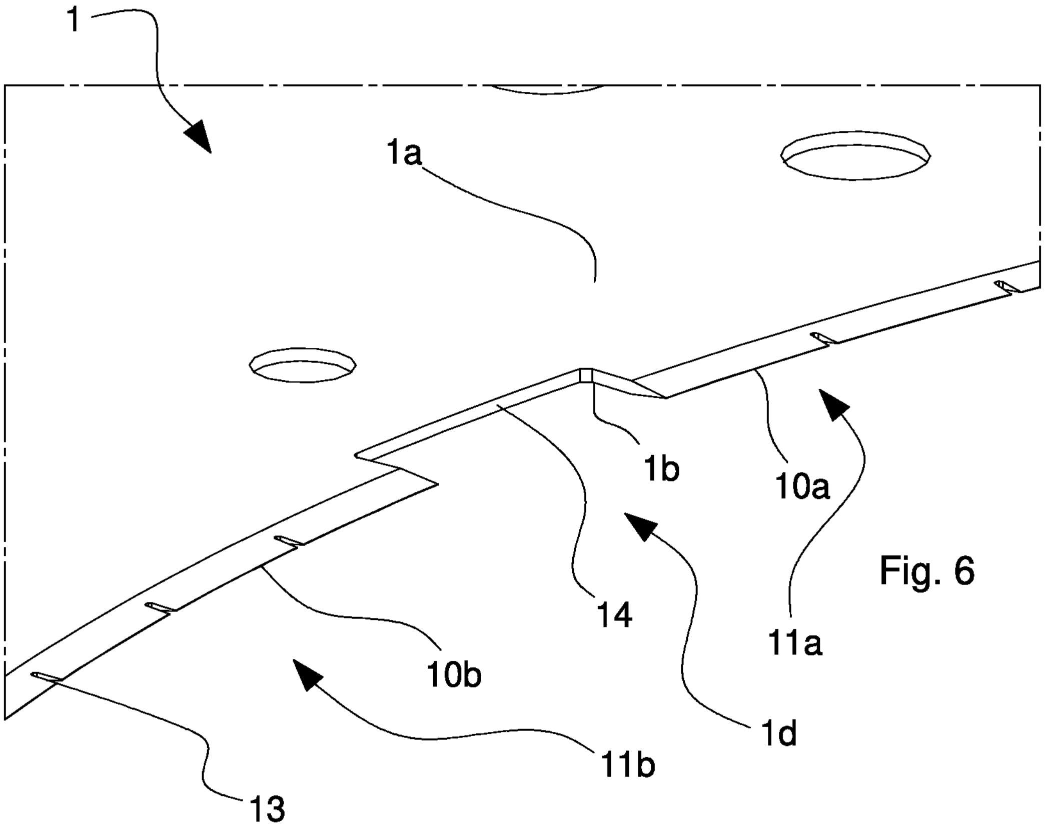
FIG. 6 is a detail of FIG. 3, showing the second horizontal cutting tool.
Figure 6A:
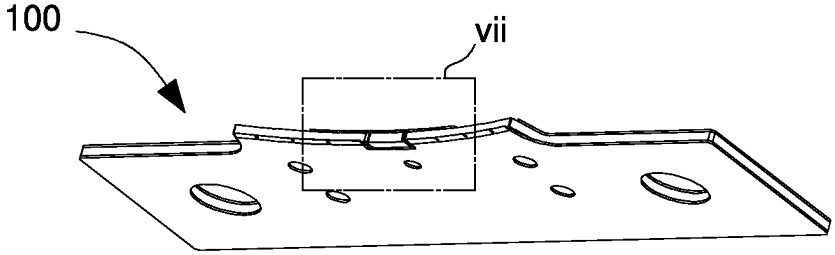
FIG. 6A is a perspective view from below of the knife of FIG. 1.
Figure 7:
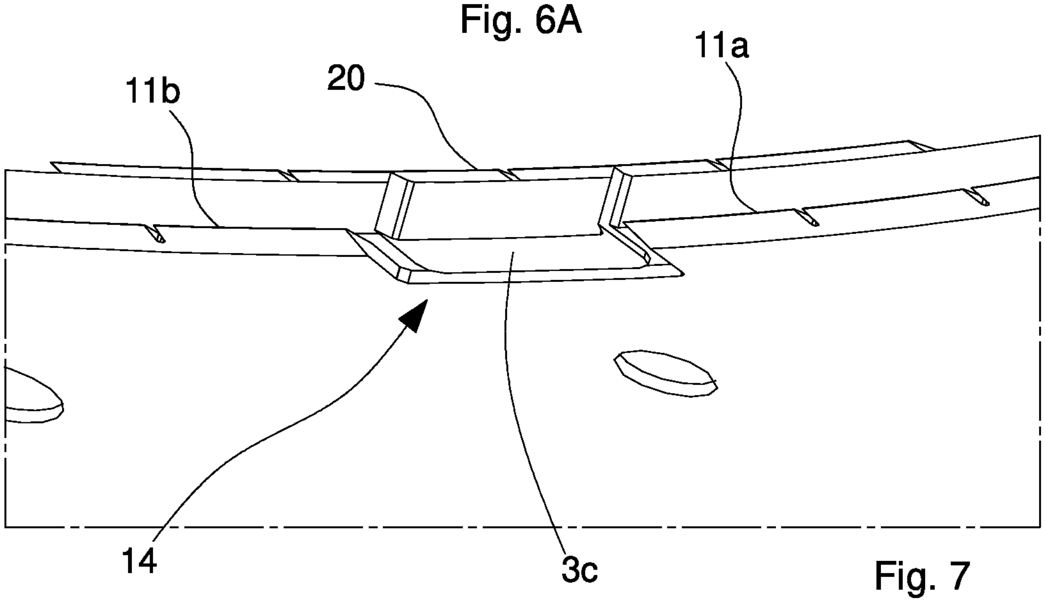
FIG. 7 is a detail of FIG. 6A, in which, in particular, a support protrusion of the transverse cutting tool is shown.
Figure 8:
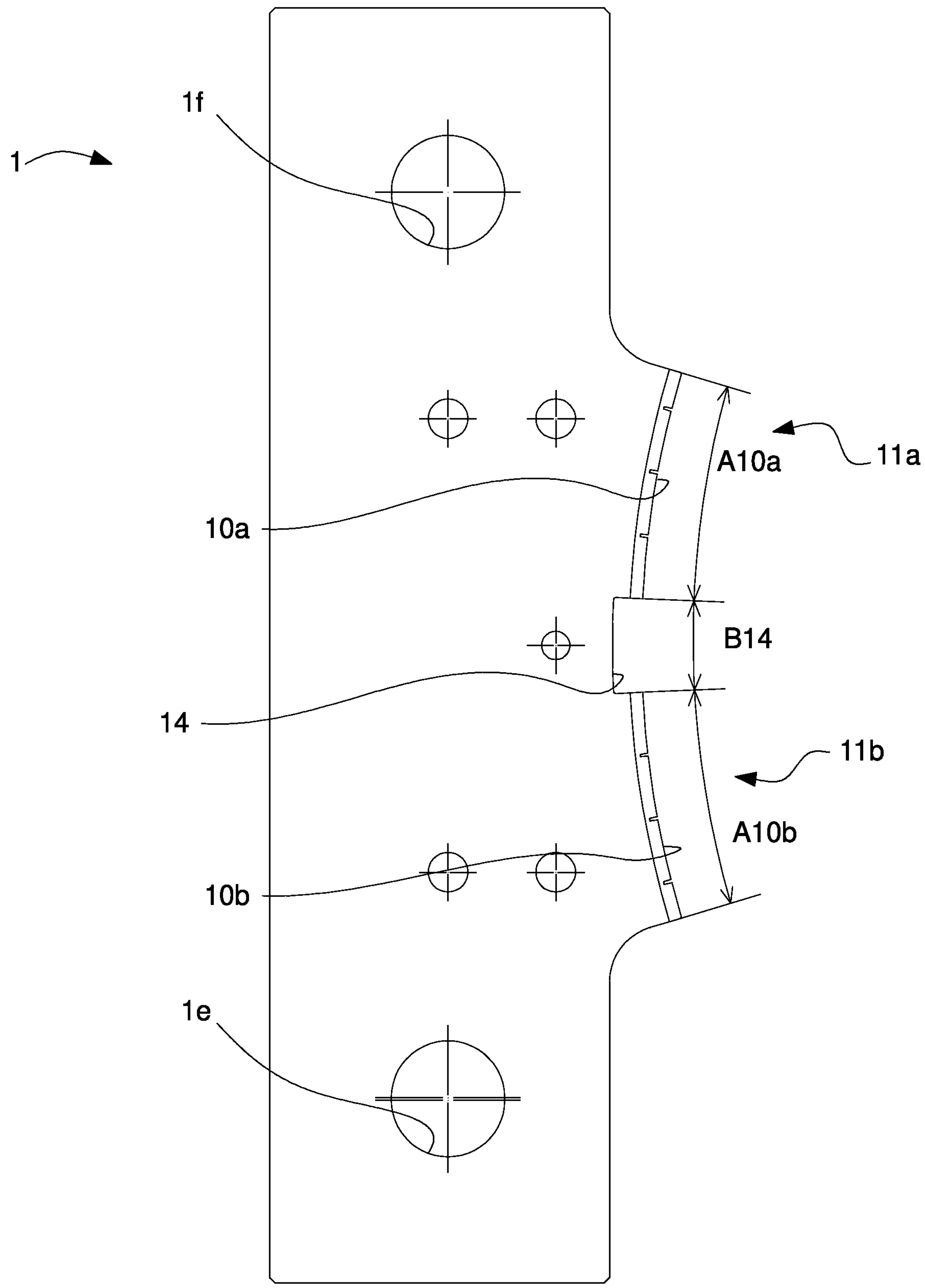
FIG. 8 is a plan view from above of the first horizontal cutting tool of FIG. 1.

Referring to FIGS. 3, 6 and 8, the first horizontal cutting tool 1 has a plate structure, i.e. it mainly extends along two main dimensions with respect to a transverse dimension (thickness). The first horizontal cutting tool 1 has in particular a rectangular plan. The first horizontal cutting tool 1 has two plane faces, opposite and substantially parallel to each other and to the plane P; the first lower face 1*b* and the first upper face 1*a*.

The first horizontal cutting tool 1, in a first peripheral region 1*d*, includes first blades 11*a*, 11*b* and a first recess 14. The first blades 11*a*, 11*b* and the first recess 14 are arranged in an alternate manner along the first peripheral region 1*d* of the first horizontal cutting tool 1 (i.e. along the advancement direction T). The first peripheral region 1*d* faces, in use, the path or equivalently the cap 7. The first blades 11*a*, 11*b* may include one or more notches 13 arranged to form the bridges 73.

Each first blade 11*a*, 11*b* of the first blades 11*a*, 11*b* is provided at a free end thereof with a respective first cutting edge 10*a*, 10*b*.

In the specific example, the first horizontal cutting tool 1 has two first cutting edges 10*a*, 10*b* and a first recess 14 arranged between the first two cutting edges 10*a*, 10*b*. The first recess 14 is arranged to separate the first cutting edges 10*a*, 10*b* and to receive a portion of cutting tools, as described hereinafter.

Referring to FIG. 8, the first blade indicated by the number reference 11*a* (or equivalently a first cutting edge 10*a*) extends over a first horizontal dimension A10*a* and a first blade 11*b* (or equivalently a first cutting edge 10*a*) extends over a horizontal dimension A10*b*. The horizontal dimension A10*a* and the horizontal dimension A10*b* may be substantially equal. The first recess 14 extends over a horizontal dimension of a first recess B14.

Within the framework of the invention, "horizontal dimension" of a knife element (such as a blade, a recess, a combination of cutting edges) means a dimension (linear or curved or angular) measured on a horizontal measure plane parallel to plane P.

The first cutting edges 10*a*, 10*b* lie on a same first plane parallel to plane P. With respect to the plane P, on a vertical axis Z, orthogonal to the plane P, the first plane is at the first height. The first cutting edges 10*a*, 10*b* define a first curved line substantially in an arc-of-circumference shape, the centre of which is located outside the knife 100 on a first axis substantially orthogonal to the plane P.

The first notches 13 are suitably spaced apart and sized so as not to interrupt the continuity of the material, for example not to locally alter or to make incisions without piercing the side wall 70 of the cap, in order to form bridges 73.

In a embodiment not depicted, the first horizontal cutting tool may include more than two first horizontal blades, such as three horizontal blades intervalled by two recesses. In alternative, in a further embodiment not depicted the first horizontal cutting tool may include four horizontal blades intervalled by three recesses.

The first horizontal cutting tool 1 is arranged to contribute to forming straps 74*a*, 74*b* on the side wall 70 with the second horizontal cutting tool 2, and performs the notches and cuts separating the body 71 from the tamperproof band 72.

Figure 4:
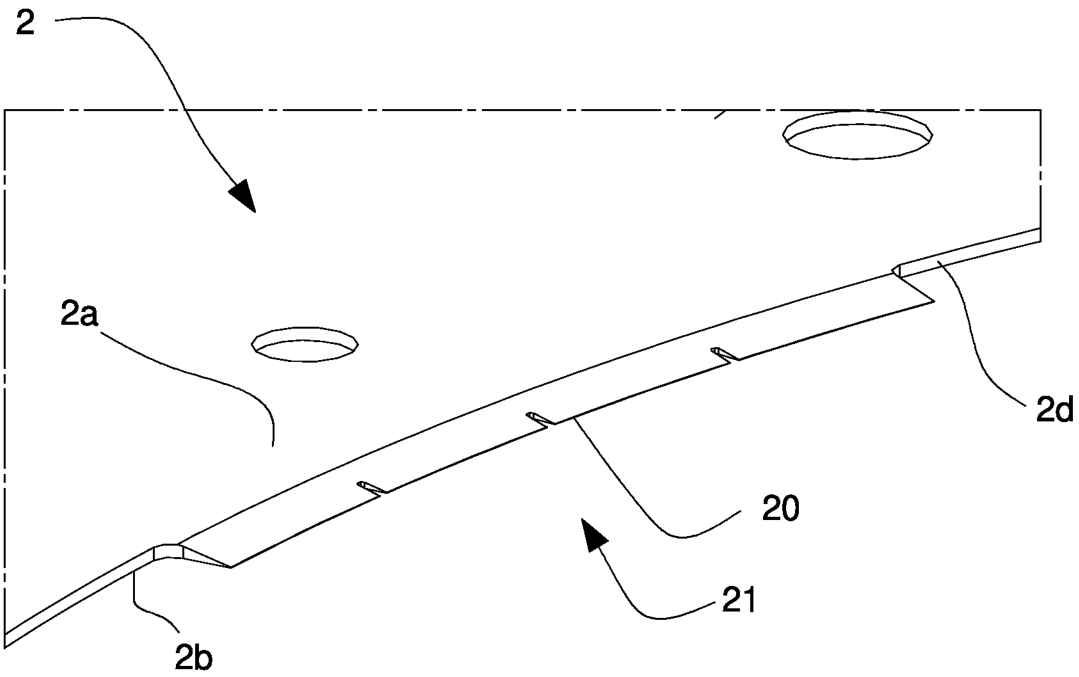
FIG. 4 is a detail of FIG. 3, showing the second horizontal cutting tool.
Figure 5:
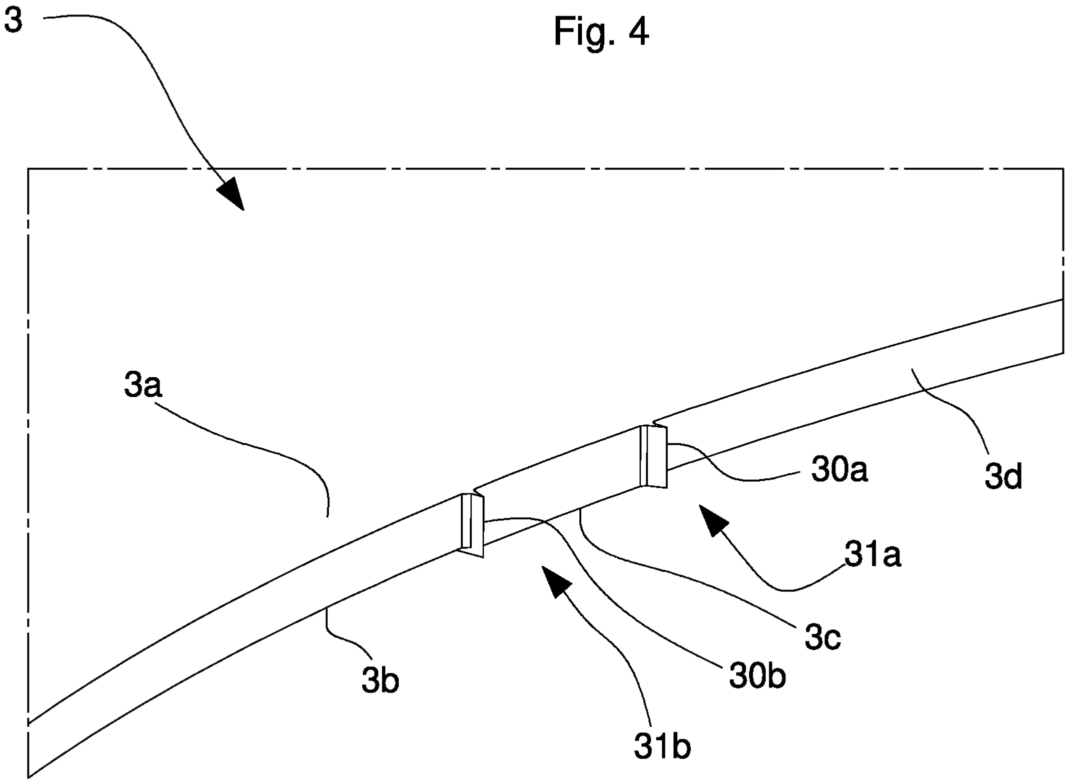
FIG. 5 is a detail of FIG. 3, showing the transverse cutting tool.
Figure 10:
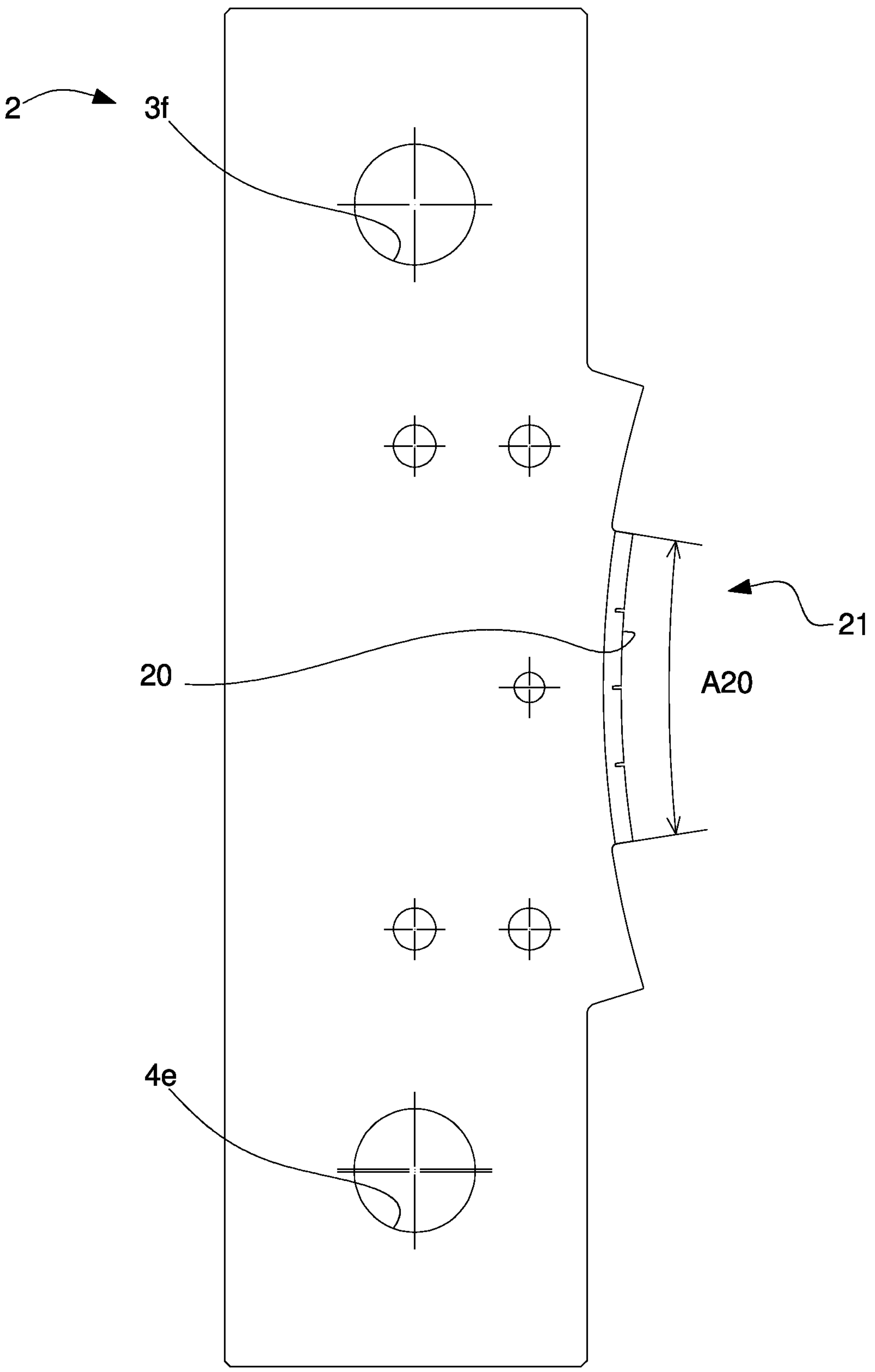
FIG. 10 is a plan view from above of the second horizontal cutting tool of FIG. 1.

Referring to FIGS. 3, 4 and 10, the second horizontal cutting tool 2 has a plate structure, i.e. it mainly extends along two main dimensions with respect to a transverse dimension (thickness). The second horizontal cutting tool 2 has in particular a rectangular plan. The second horizontal cutting tool 2 has two plane faces, opposite and substantially parallel to each other and to the plane P: the second lower face 2*b* and the second upper face 2*a*.

The second horizontal cutting tool 2, in a second peripheral region 2*d*, includes a second blade 21 provided at a free end thereof with a second cutting edge 20. The second peripheral region 2*d* faces, in use, the path or equivalently the cap 7.

In the knife indicated by number reference 100, the second horizontal cutting tool 2 includes in the second peripheral region 2*d* a single second blade 21 provided with a cutting edge 20.

Referring in particular to FIG. 10, the second blade 20 may extend on the second peripheral region 2*d*—along the advancement direction T—over a horizontal direction A20.

The second blade 21 may include one or more second notches arranged to form the bridges 73. In other words, the ones or more second notches of the second blade 21 have a shape and function similar to that of the above-described one or more first notches 13.

The second cutting edge 20 lies on a second plane parallel to the plane P. With respect to the plane P, on a vertical axis Z, orthogonal to the plane P, the second plane is at the second height. The second height is at a height greater than the first height along the vertical axis Z. The second horizontal cutting edge 20 defines a second curved line substantially in an arc-of-circumference shape, the centre of which is located outside the knife 100 on a second axis substantially orthogonal to the plane P.

In the knife indicated by number reference 100, the second horizontal cutting tool 2 is arranged to contribute to form straps 74*a*, 74*b* on the side wall 70 together with the first horizontal cutting tool 1.

In addition, the second horizontal cutting tool 2 is arranged to contribute to form a horizontal part of the tab portion 79 on the side wall 70 together with the transverse cutting tool 3.

In a second embodiment herein described, in a further second horizontal cutting tool, more than a horizontal blade is provided, in particular two horizontal blades intervalled by a recess are provided.

Referring to FIGS. 1-3, 5 and 9, the transverse cutting tool 3 has a plate structure, parallel to the plane P, and in particular a rectangular plan. The transverse cutting tool 3 has two plane faces opposite and substantially parallel to each other and to the plane P, i.e. the lower face 3*b* and the upper face 3*a*.

The transverse cutting tool 3 is arranged to perform transverse notches, on the side wall 70.

In a peripheral region 3*d* thereof, the transverse cutting tool 3 includes one or more transverse blades 31*a*, 31*b* provided with respective transverse cutting edges 30*a*, 30*b*. Each transverse cutting edge 30*a*, 30*b* of the transverse cutting edges 30*a*, 30*b* extends substantially vertically between the first height and the second height. Within the framework of the invention, "substantially vertically" includes parallel to the vertical axis Z and an angle between the transverse cutting edge 30*a*, 30*b* and the vertical axis Z included in a range of values; such angle is taken on the reference plane passing through the vertical axis Z and tangent to the advancement direction T. Such angle has to be intended as an acute angle that each transverse cutting edge 30*a*, 30*b* forms with the vertical axis Z. In particular, the angle may be in the range ±25° or in the range ±15° or in the range ±5°.

Figure 9:
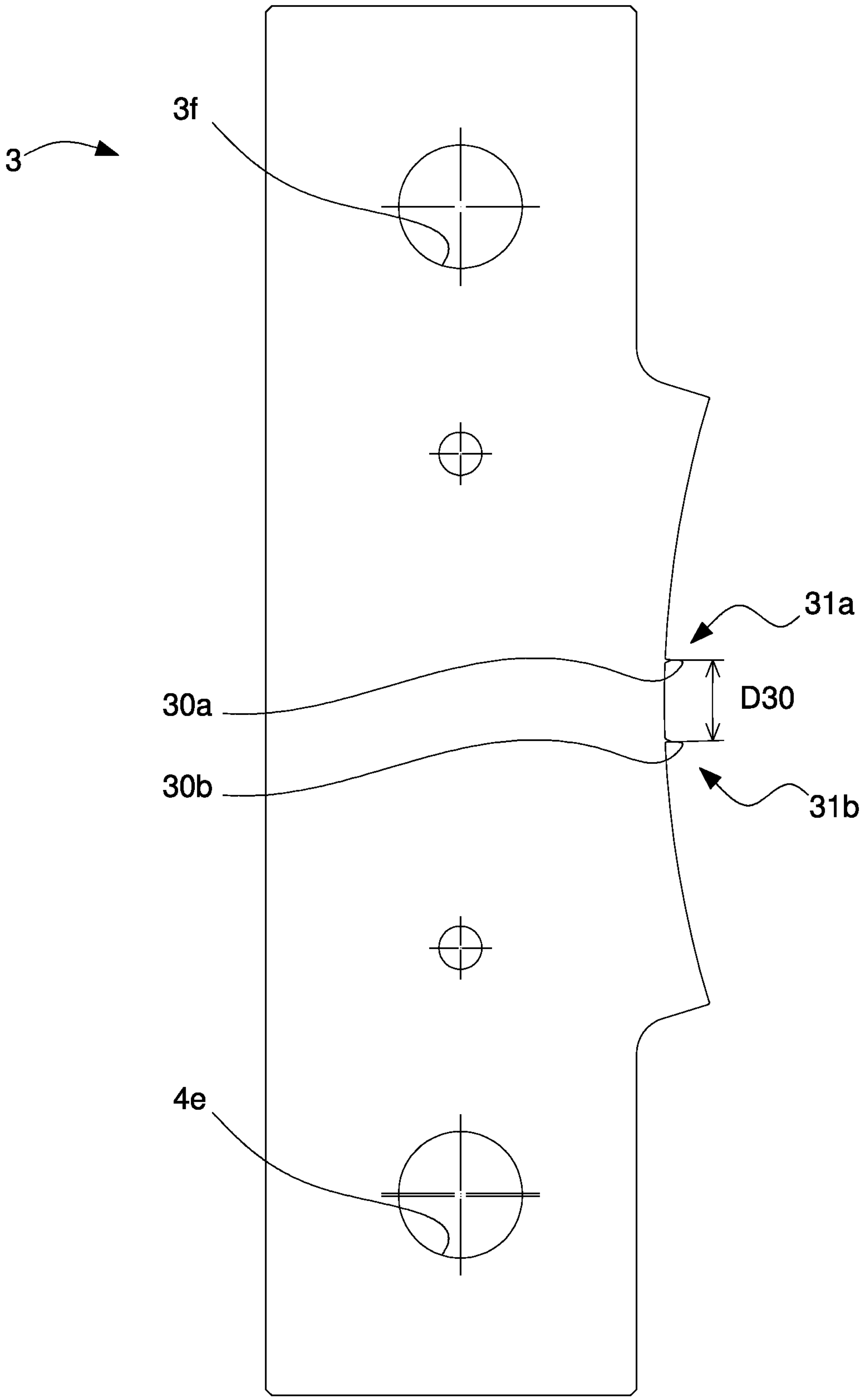
FIG. 9 is a plan view from above of the transverse cutting tool of FIG. 1.

Referring to FIG. 9, the transverse blades 31*a*, 31*b* are spaced apart from each other—along the advancement direction T—over a horizontal dimension D30. The horizontal dimension D30 is smaller than the horizontal dimension of the first recess B14.

In the specific example, the transverse cutting tool 3 includes two transverse cutting edges 30*a*, 30*b*: a transverse cutting edge 30*a* and a transverse cutting edge 30*b*. The two transverse cutting edges 30*a*, 30*b* are oriented substantially parallel to each other and relative to the vertical axis Z.

In addition or in alternative to the two transverse cutting edges substantially parallel to each other 30*a*, 30*b* and to the vertical axis Z, a further embodiment of the transverse cutting tool not shown may include one or more negative-slope blades provided on the respective free ends of tilted cutting edges with a negative slope and/or one or more positive-slope vertical blades with respective tilted cutting edges with a positive slope. For example, in this embodiment not shown, two or three or four or five positive-slope blades may be provided as alternate to respective negative slope blades to form respective tab portions. In other words, in this embodiment not shown, each transverse cutting edge may extend with a non-zero angle with respect to the vertical axis Z on the reference plane.

Therefore, with respect to the Cartesian plane formed by the vertical axis Z orthogonal to the plane P and by an axis substantially oriented as the advancement direction T, originating in any point of the advancement direction T, the transverse cutting edges of the transverse blades may be oriented on the peripheral region 3*d* in the following alternative ways: vertically, such as the transverse blades 31*a*, 31*b*, with a negative orientation (not shown), with a positive orientation (not shown).

The peripheral region 3*d* of the transverse cutting tool 3 defines a substantially arc-of-circumference curve lying in a plane substantially parallel to the plane P, the centre of the circumference is positioned outside the knife 100, on an axis substantially orthogonal to the plane P. The peripheral region 3*d* defines, in addition, a curved abutment surface against which the side wall 70 of the cap 7 may be rotated on its own rotation axis R while the knife 100 makes the incisions and cuts on the side wall 70. In other words, a curved abutment surface defined by the peripheral region 3*d* contributes to guide the cap 7 along its interaction path with the blade 100 in the advancement direction T.

In a embodiment not shown the transverse blades may include notches (not shown), spaced apart and sized in a manner similar to and with the same function as one or more previously described first notches 13.

The transverse blade 31*a* and the transverse blade 31*b* extend below the lower face 3*b* of the transverse cutting tool 3 and are supported by a support protrusion 3*c* which projects from the lower face 3*b* below it.

In a embodiment not shown, the transverse blade 31*a* may be entirely contained in the thickness of the transverse cutting tool 3, i.e. its lower end does not protrude from the lower face 3*b*. In this embodiment, the support protrusion 3*c* may not be present.

In a further embodiment not shown the transverse blades 31*a*, 31*b* may be supported by respective distinct support protrusions, each projecting below the lower face 3*b*.

The support protrusion 3*c* is shaped to be received in a recess present on the first horizontal cutting tool 1. In particular, the support protrusion 3*c* is received in the first recess 14 of the first horizontal cutting tool 1. This allows one of the lower ends of the transverse cutting edges 30*a*, 30*b* to reach a same first height of the first two horizontal cutting edges 10*a*, 10*b* or to reach a height lower than the first height. In the example shown in FIGS. 1-11 the lower ends of the transverse cutting edges 30*a*, 30*b* both reach the first height.

Figure 2:
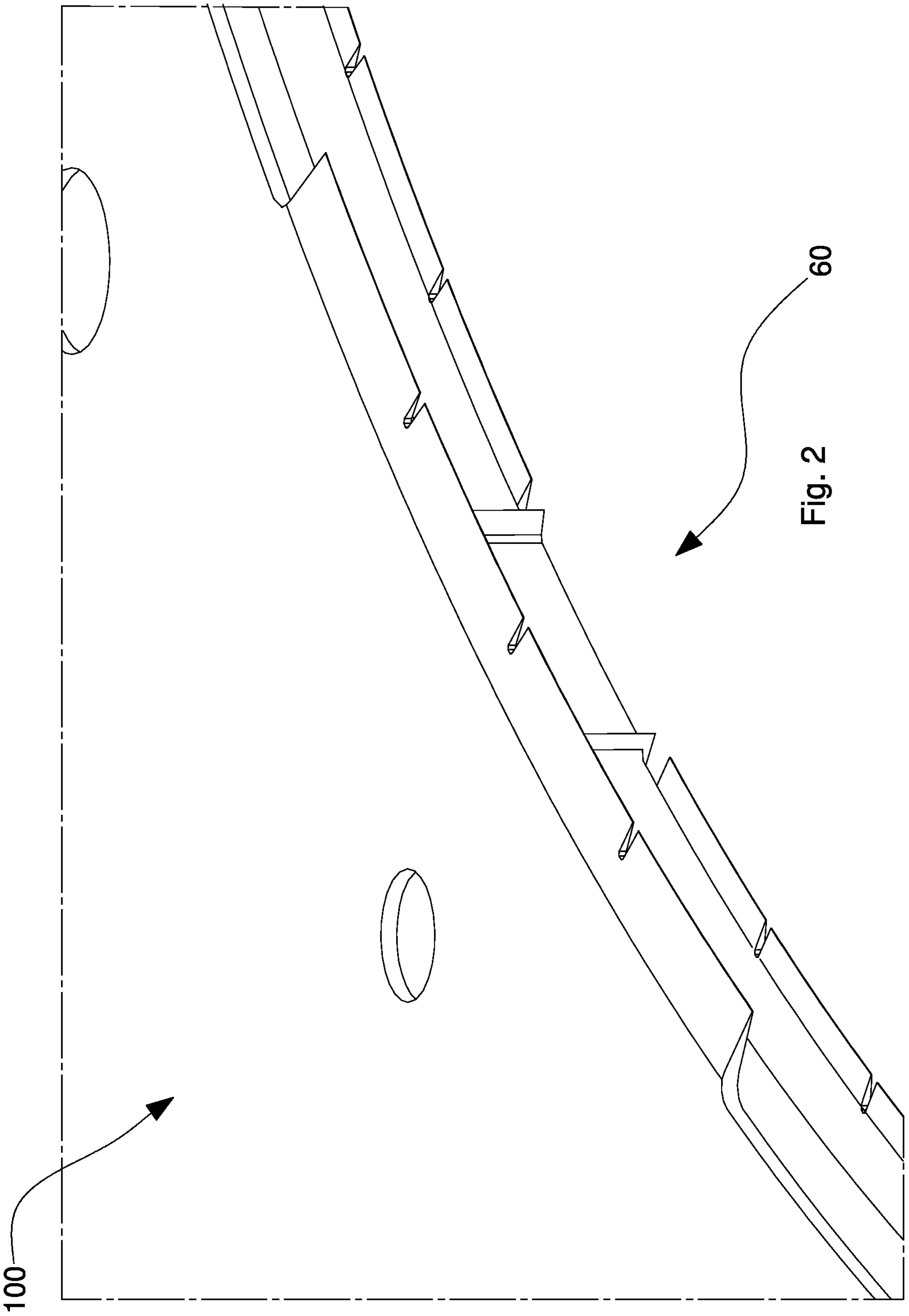
FIG. 2 is a detail of FIG. 1, showing an arrangement of cutting edges.

Still referring to FIGS. 1-3, an assembly configuration of the knife 100 provides interposing the transverse cutting tool 3 between the second horizontal cutting tool 2 and the first horizontal cutting tool 1, as described hereinafter.

In such assembly configuration of the knife 100, the second lower face 2*b* is in contact with the upper face 3*a*, and the first upper face 1*a* is in contact with the lower face 3*b*. In such assembly configuration of the knife 100, the first axis of the first curve defined by the first cutting edges 10*a*, 10*b*, the second axis of the second curve defined by the second cutting edge 20, the axis of the curved abutment surface defined in the peripheral region 3*d* are further substantially coincident to each other. In particular, the first axis, the second axis and the curved abutment axis defined by the peripheral region 3*d* are substantially coincident with the axis of revolution of the mandrel-holder carousel.

The knife 100 is removably fixed to the frame of the cutting apparatus by means of a fastening arrangement, not shown, such as a screw arrangement or a bolt arrangement, which further allow the cutting devices 1, 2, 3 to be removably locked and fixed to each other. Referring to FIG. 3, such fastening arrangement may be fitted along vertical fitting axes M1, M2, i.e. substantially orthogonal to the plane P. Referring again to FIG. 3, each one of the cutting tools 1, 2, 3 includes in particular, at least a through-hole 1*e*, 2*e*, 3*e*, 1*f*, 2*f*, 3*f*, arranged to receive the fastening arrangement so that the cutting devices 1, 2, 3 may be removed from, or fitted into the layered structure, depending on a stacking order from top downwards. Referring in particular to FIGS. 8, 9 and 10 the at least one hole 1*e*, 2*e*, 3*e*, 1*f*, 2*f*, 3*f* may include, in particular, at least an eccentric hole, or eyelet 1*e*, 2*e*, 3*e* arranged to allow adjusting the position of the cutting tools 1, 2, 3 independent of each other, in particular on a plane parallel to the plane P. The at least one hole 1*e*, 2*e*, 3*e*, 1*f*, 2*f*, 3*f* allows, in particular, to selectively remove each of the cutting tools 1, 2, 3 to allow removing and/or inserting additional cutting devices, for example to replace a cutting tool with the worn cutting edges or to change the arrangement of the cutting edges. For example, it is possible to replace only the transverse cutting edge 3, restoring the layered structure without replacing the first horizontal cutting tool 1 and/or the second horizontal cutting tool 2.

The layered structure of the knife and the corresponding assembly configuration allow to vary the arrangement of cuts and notches to be made on the caps by adding and/or replacing cutting tools in the assembly configuration. In particular, since for a given dimension (such as the diameter) of a cap the first horizontal cutting tool may be maintained, the transverse cutting tool may be replaced, for example, with another transverse cutting tool having a different distance between the transverse blades and/or a different thickness, to produce on a cap with a same dimension a different shape of the straps or tab, without having to replace also the horizontal cutting tool.

In addition or in alternative, the second horizontal cutting tool may be replaced with a further second horizontal cutting tool to vary for example the (circumferential) length of the straps, without replacing the first horizontal cutting tool and/or the transverse cutting tool.

In such assembly configuration of the knife 100, the arrangement of the cutting edges 60 is defined by the relative position between the blades 11*a*, 11*b*, the second blade 21 and the transverse blades 31*a*, 31*b*.

In the knife 100 shown in FIGS. 1-11, the arrangement of the cutting edges 60 lies on a single cutting surface, in particular on a cylindrical cutting surface whose main axis is outside the knife 100. In other words, in the knife 100 the cutting edges have the same depth. The main axis of such cylindrical cutting surface may be substantially coincident with the revolution axis of the mandrel-holder carousel.

In alternative, in a embodiment of the knife not shown, the cutting edges of each of the cutting tools 1, 2, 3 may have different depths. In other words, the cutting edges may be arranged more or less spaced apart from the mandrel-holder carousel axis, for example the transverse cutting edges 30*a*, 30*b* may be more retracted (such as more spaced apart from the axis of the mandrel-holder carousel) with respect to the second cutting edge 20 and/or the first cutting edge 10*a*, 10*b*.

Figure 11:
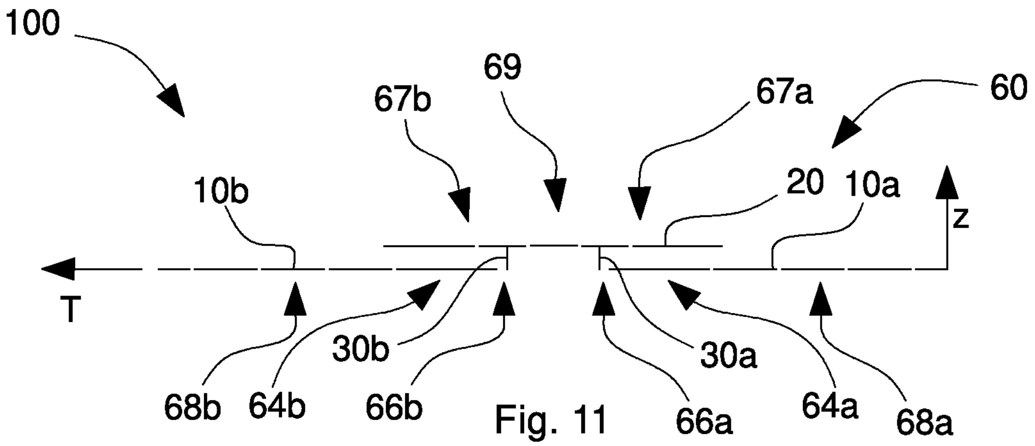
FIG. 11 is a front partial view of the knife of FIG. 1, in which the cutting portion of the knife is shown.

Referring now to FIG. 11, the arrangement of the cutting edges 60 of the knife 100 is defined by the first cutting edges 10*a*, 10*b* lying on a first plane parallel to the plane P, the second cutting edge 20 lying on a second plane parallel to the plane P, and transverse cutting edges 30*a*, 30*b* arranged substantially orthogonal to the plane P. The arrangement of the cutting edges 60 may include possible oblique cutting edges that are transverse to the plane P.

As already mentioned above, the first cutting edges 10*a*, 10*b* and the second cutting edges 20 are arranged between each other at different heights along the vertical axis Z, i.e. at different distances from the plane P.

Referring to FIGS. 12 and 13, depending on the relative position between the cutting edges of the cutting tools, the knife 100 forms on the side wall 70 of the cap 7 different parts.

The knife 100 may form on the side wall 70 in particular one or more intended detachment lines 78*a*, 78*b*, arranged on the same plane and obtained by the first cutting edges 10*a*, 10*b* penetrating through the thickness of the side wall 70.

The knife 100 may form on the side wall 70 in particular one or more connection portions, or straps 74*a*, 74*b*. Each strap 74a, 74b may in turn include in particular a central portion 77a, 77b, obtained by the penetration of the first cutting edges 10a, 10b and of end parts of the second cutting edge 20. Each strap 74a, 74b may in turn include in particular a joint portion 76a, 76b, obtained by the penetration of the transverse cutting edges 30a, 30b, arranged in particular to connect the strap 74a, 74b to the main body 71.

The knife 100 may form on the side wall 70 a portion of a tab 79, obtained by the penetration of the transverse cutting edges 30a, 30b, and by an intermediate part of the second horizontal cutting edge 20.

In detail, referring now to FIG. 11, along the advancement direction T, the knife 100 may include in particular an opening formation part 68a, including the first cutting edge 10a that lies on the first plane parallel to the plane P. The opening formation part 68a extends over the horizontal direction A10a that may be included between 25% and 55%, preferably between 30% and 50%, still more preferably between 35% and 45%, of the length of the knife 100, i.e. of the horizontal dimension of the cutting portion 60. The opening formation part 68a corresponds on the cap 7 to the relative intended detachment line 78a (FIGS. 12 and 13). In other words, the opening formation part 68a is in particular arranged to make circumferential notches on the side wall 70 at a first height on the vertical axis Z to define the tamper-proof ring 72 and the main body 71.

The knife 100 may include in particular a connection formation part 64a. The connection formation part 64a occupies a region of the knife 100 extending between 5% and 30%, preferably between 18% and 25%, still more preferably between 10% and 20% of the length of the knife 100. The connection formation part 64a corresponds to the strap 74a on the cap 7. In other words, the connection formation part 64a is in particular arranged to make circumferential notches on the side wall 70 in order to determine, in use, the connection portion 74a, connecting the tamper-proof ring 72 and the main body 71. The connection formation part 64a may in turn include, in particular, a connection formation central part 67a, in which the first cutting edge 10a overlaps, along the vertical axis Z, to the second cutting edge 20 lying on the second plane, i.e. at a height greater than the first cutting edge 10a. The connection formation central part 67a corresponds to a respective central part of the strap 77a. The connection formation part 64a may in turn include in particular a joint formation part 66a, located in particular downstream of the connection formation central part 67a, including the transverse cutting edge 30a. The joint formation part 66a corresponds to the respective joint portion 76a on the cap 7. In other words, the joint formation part 66a is arranged in particular to determine in use the joint portion 76a.

The knife 100 may in particular include a tab formation part 69, including the transverse cutting edge 30a, the intermediate part of the second horizontal cutting edge 20 and the transverse cutting edge 30b. In particular in the example shown, the two vertical cutting edges 30a and 30b are parallel to each other and orthogonal to the plane P and the second horizontal cutting edge 20 is parallel to the plane P. The tab formation part 69 corresponds to the tab portion 79 on the side wall 70. In other words, the tab formation part 69 is arranged to make notches on the side wall 70 to determine, in use, the tab portion 79 on the main body 71. The tab formation part 69 extends over a distance between the cutting edges 30a, 30b of between 10% and 15% of the length of the knife 100.

The knife 100 may in particular include a further connection formation part 64b. The further connection formation part 64b occupies a region of the knife 100 that extends between 5% and 30%, preferably between 18% and 25%, still more preferably between 10% and 20% of the length of the knife 100. The further connection formation part 64b corresponds to the strap 74b. The further connection formation part 64b may in turn include in particular a further connection formation central part 67b wherein the first cutting edge 10b overlaps along the vertical axis Z to a final part of the second cutting edge 20b lying on the second plane, i.e. at a height greater than the first cutting edge 10b. The further connection formation central part 67b corresponds to the respective central portion of the strap 77b. The connection formation part 64b may in turn include in particular a further joint formation part 66b, located in particular upstream of the further connection formation central part 67b, including the transverse cutting edge 30b. The second cutting edge 20 is arranged in particular perpendicular to the transverse cutting edge 30b. The further joint formation part 66b corresponds to the respective joint portion 76b on the cap 7.

The knife 100 may include in particular a further opening formation part 68b, including the first cutting edge 10b that lies on the first plane parallel to the plane P. The opening formation part 68b extends for example between 25% and 55%, preferably between 30% and 50%, still more preferably between 35% and 45%, of the length of the knife 100. The opening formation part 68b corresponds on the cap 7 to the relative intended detachment line 78b (FIGS. 12 and 13).

Referring in particular to FIGS. 14-24, a knife 100' according to a second embodiment is described.

The layered structure of the knife 100' includes a further first horizontal cutting tool 1', a further transverse cutting tool 3', a further second horizontal cutting tool 2'.

Compared to the knife 100, the layered structure of the knife 100', in addition to a further first horizontal cutting tool 1' and a further second horizontal cutting tool 2', includes a third horizontal cutting tool 4' arranged to perform a still further circumferential notch at a third height on the side wall 70 to determine in use together with the further transverse cutting tool 3' the tab portion 79' on the main body 71.

As mentioned, unlike the knife 100, the knife 100' includes a second horizontal cutting tool 2' provided with two horizontal blades 21a', 21b' separated by a recess 24'.

Unlike the knife 100, in an assembly configuration of the knife 100' the further third transverse cutting tool 3' is stacked above the further second horizontal cutting tool 2'.

In the hereinafter description of the knife 100', elements in common with the knife 100 will not be described for brevity's sake, such as elements related to the further first horizontal cutting tool 1' and the further transverse cutting tool 3' which are similar to elements of the first horizontal cutting tool 1 and of the transverse cutting tool 3 respectively. Such elements related to the knife 100' according to the second embodiment will be indicated with the references used for the knife 100 by adding a single quote mark <'>.

Similarly to the transverse cutting edge 30a, 30b in the embodiment of the knife 100, each further transverse cutting edge 30a', 30b' extends substantially vertically between the first height and the second height. Within the framework of the invention, "substantially vertically" includes parallel to the vertical axis Z and an angle between the further transverse cutting edge 30a', 30b' and the vertical axis Z included in a range of values; such angle is taken on the reference plane passing through the vertical axis Z and tangent to the advancement direction T. Such angle has to be intended as an acute angle that each further transverse cutting edge 30a', 30*b*' forms with the vertical axis Z. In particular, the angle may be in the range ±25° or in the range ±15° or in the range ±5°.

The further second horizontal cutting tool 2' includes, on a further second peripheral region **2*d*', two further second blades 21*a*', 21*b*' provided at free ends thereof with further respective second cutting edges 20*a*', 20*b*' and a further second recess 24'. The further second cutting edges 20*a*', 20*b*'** lie on a further second plane parallel to the plane P.

Figure 19:
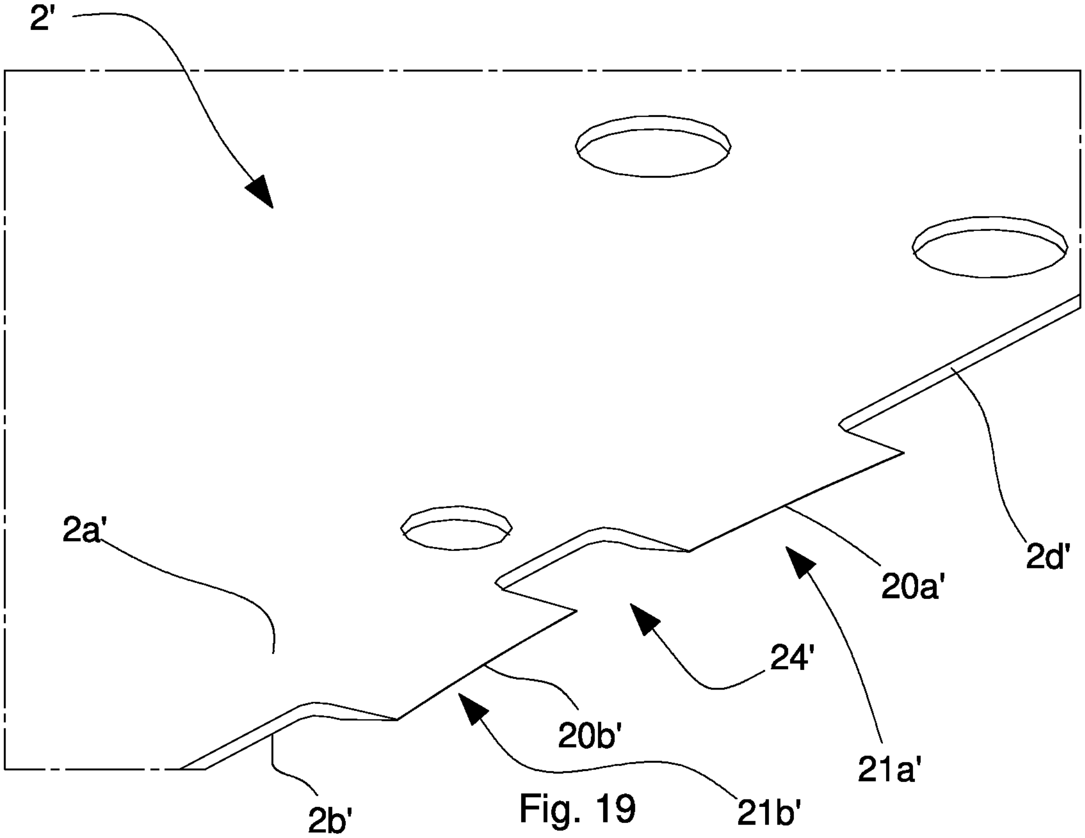
FIG. 19 is a detail of FIG. 14, showing the further second horizontal cutting tool.
Figure 20:
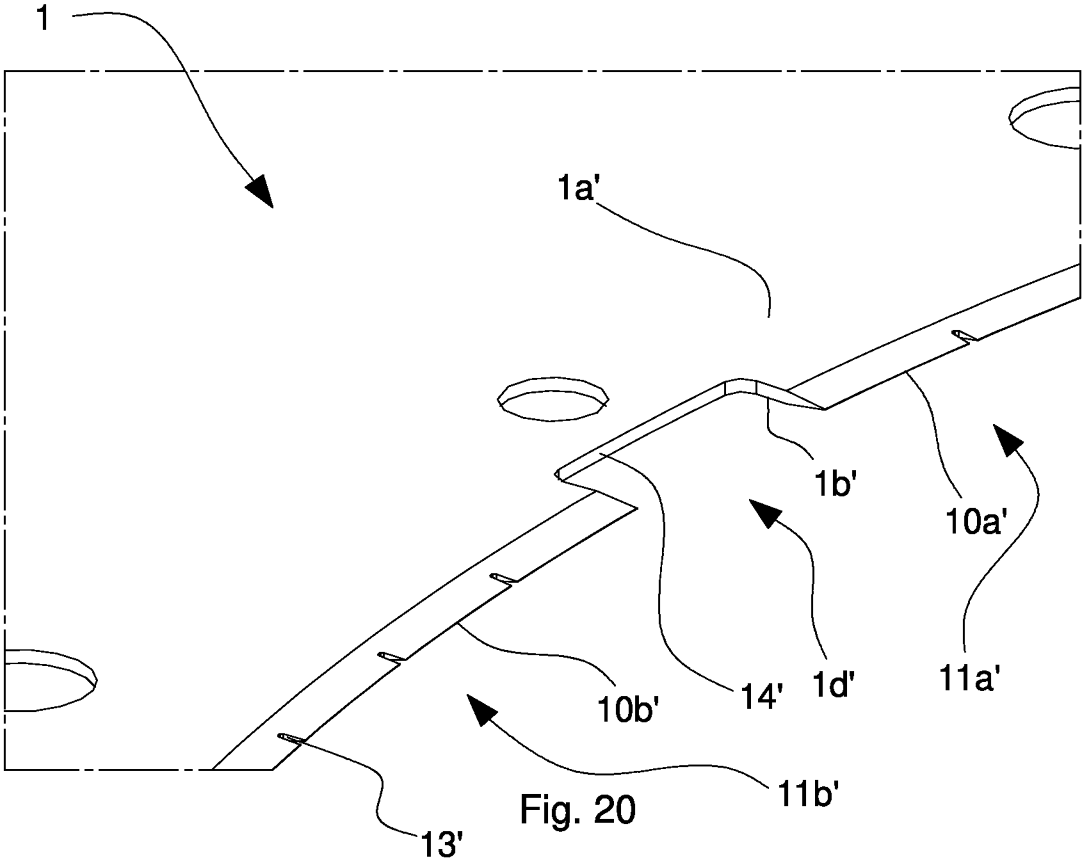
FIG. 20 is a detail of FIG. 14, showing the further first horizontal cutting tool.
Figure 21:
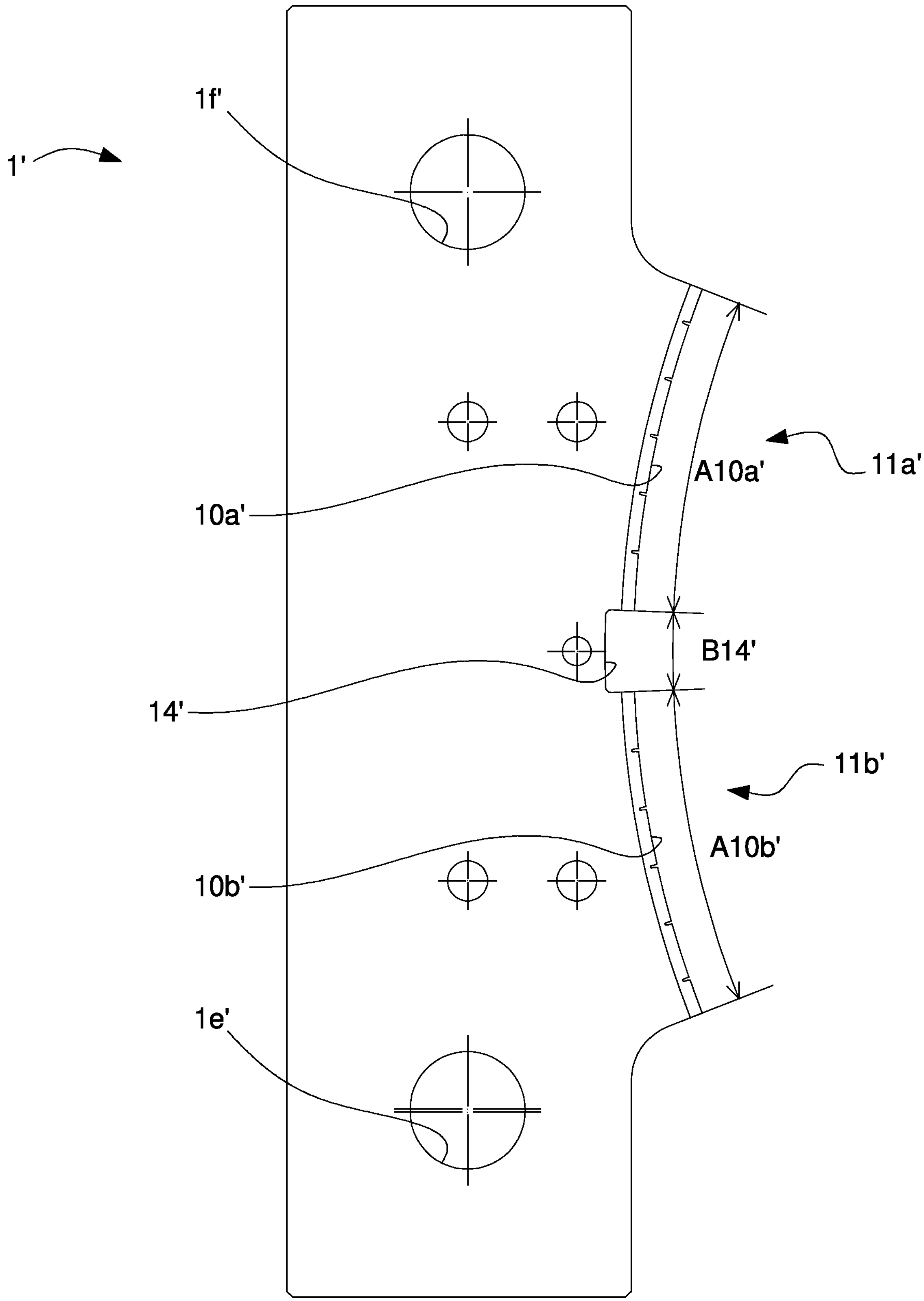
FIG. 21 is a plan view from above of the further first horizontal cutting tool of FIG. 14.
Figure 22:
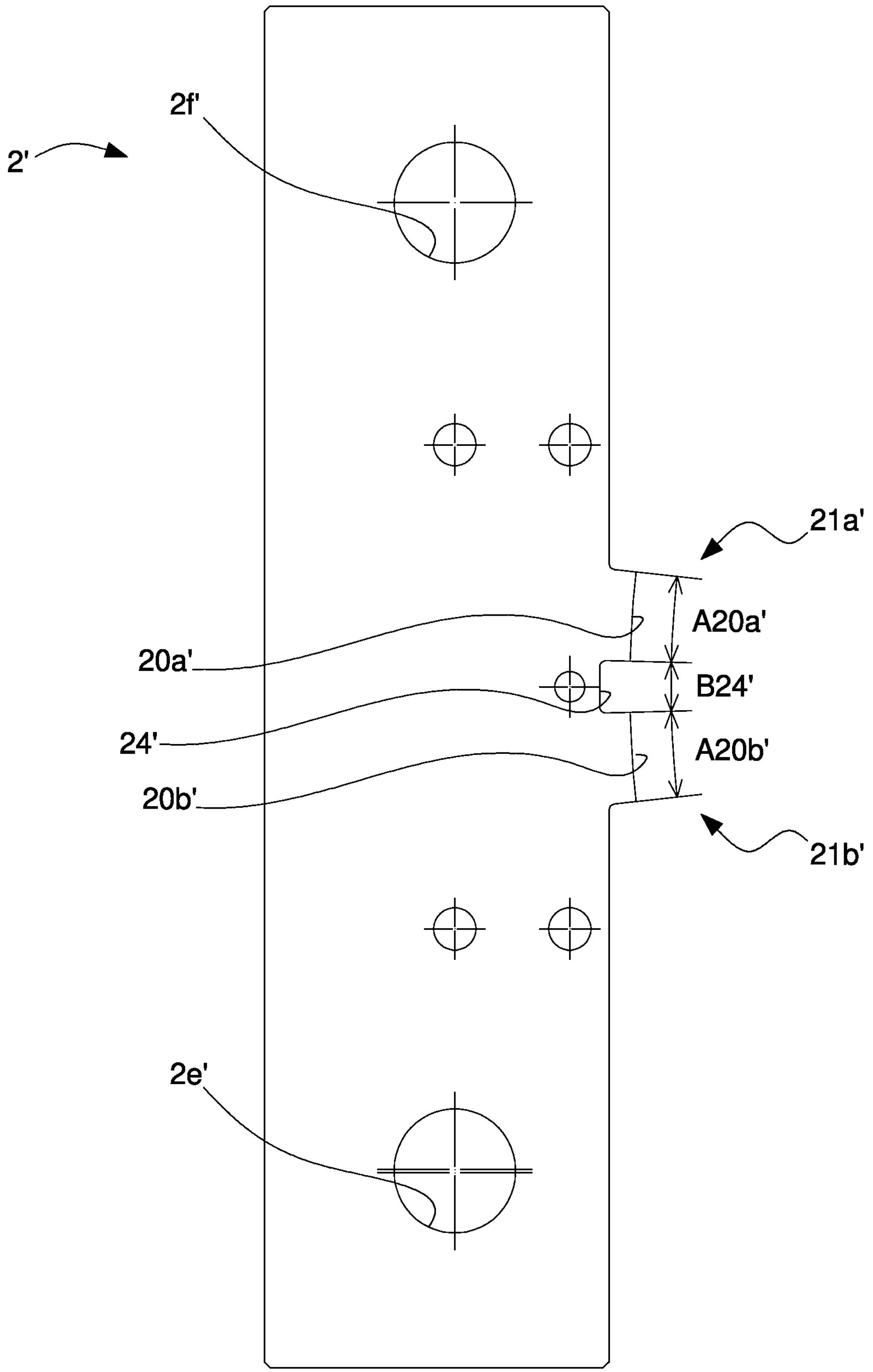
FIG. 22 is a plan view from above of the further second horizontal cutting tool of FIG. 14.
Figure 23:
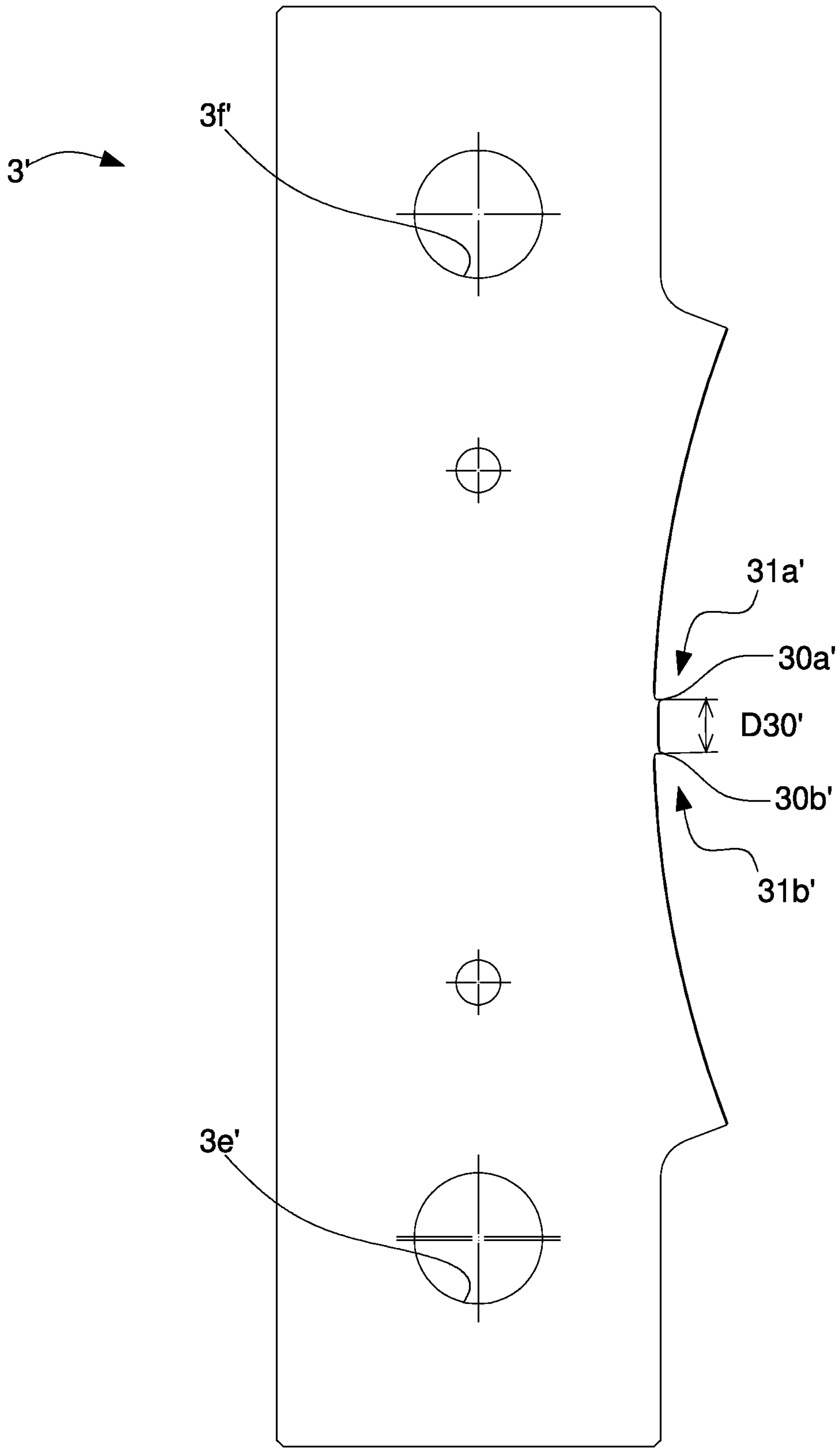
FIG. 23 is a plan view from above of the further transverse cutting tool of FIG. 14.

Referring in particular to FIGS. 19 and 22, the further second blade **21*a*' (or equivalently the further second cutting edge 20*a*') may extend on the further second peripheral region 2*d*'—along the advancement direction T—over a horizontal dimension A20*a*' and the further second blade 21*b* (or equivalently the further second cutting edge 20*b*) may extend on the further second peripheral region 2*d*' over a horizontal dimension A20*b*'. The horizontal dimension A20*a*' and the horizontal dimension A20*b*' may be substantially equal. The further second recess 24' extends over a horizontal dimension of a second recess B24'**.

The horizontal dimension of second recess B24' is lower than a horizontal dimension of first recess B14' separating two further first blades **11*a*, 11*b* obtained in the further first horizontal cutting tool 1'**.

The further second blades **21*a*', 21*b*' may include one or more further second notches arranged to form the bridges 73. In other words, the ones or more second notches of the further second blades 21*a*', 21*b*' have a shape and function similar to that of the above-described one or more first notches 13**.

With respect to the plane P, on a vertical axis Z, orthogonal to the plane P, the further second plane is at a further second height. The further second height is at a greater height—along the vertical axis Z—with respect to a further first height on which further first cutting edges **10*a*', 10*b*', obtained on the further first horizontal cutting tool 1', lie. The further second horizontal cutting edges 20*a*, 20*b* define a further second curved line substantially in an arc-of-circumference shape, the centre of which is located outside the knife 100'** on a further second axis substantially orthogonal to the plane P.

In the knife indicated by number reference 100', the further second horizontal cutting tool 2' is arranged to contribute to form straps **74*a*', 74*b*' on the side wall 70 together with the further first horizontal cutting tool 1'**.

The third horizontal cutting tool 4', in a third peripheral region **4*d*', includes a third blade 41' provided with a free end thereof of a third cutting edge 40'. The third peripheral region 4*d*' faces, in use, the path or equivalently the cap 7**.

Figure 17:
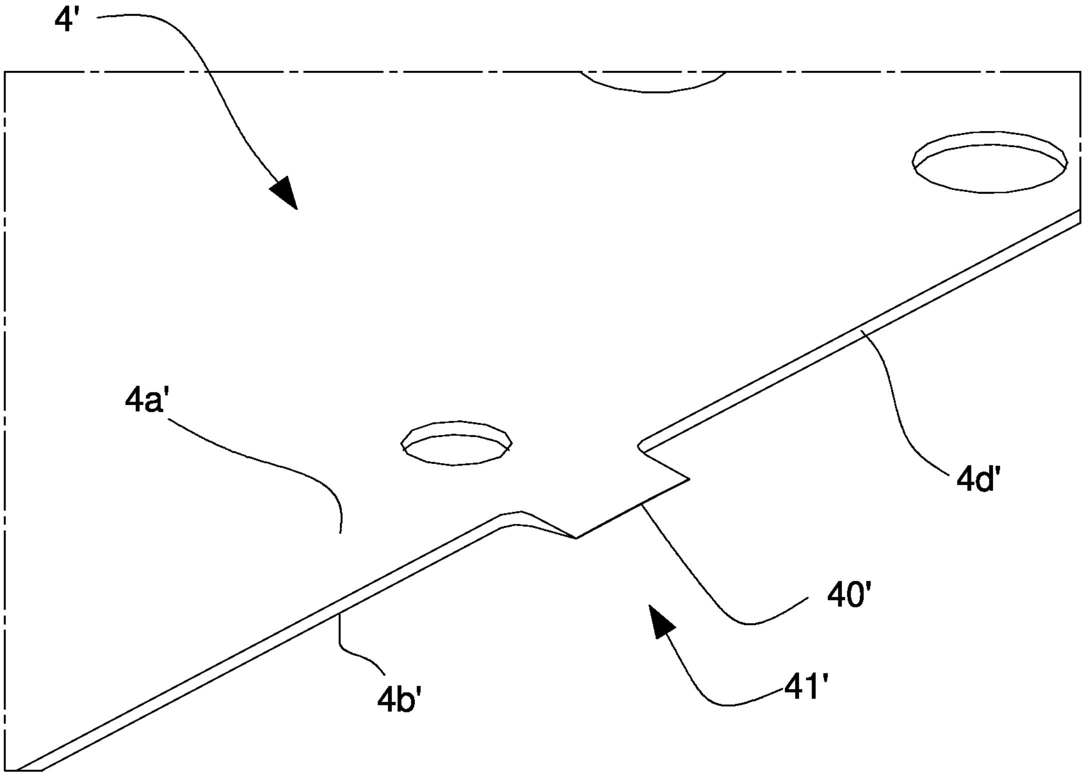
FIG. 17 is a detail of FIG. 14, showing the third horizontal cutting tool.
Figure 18:
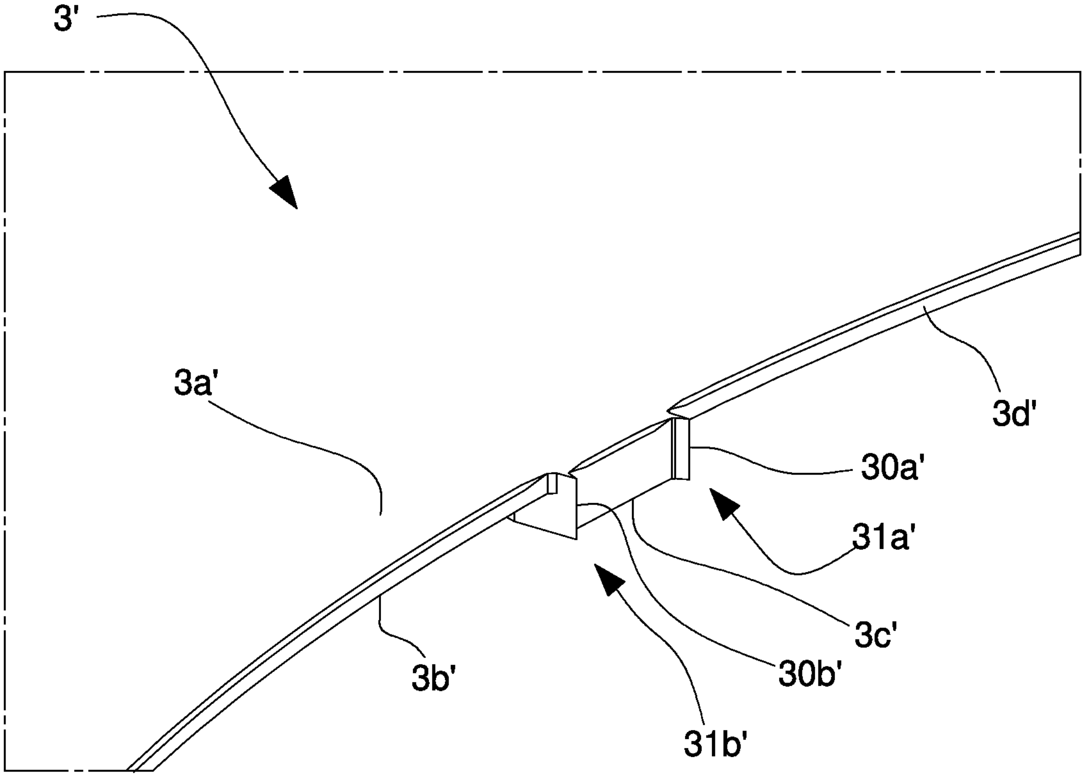
FIG. 18 is a detail of FIG. 14, showing the further transverse cutting tool.
Figure 24:
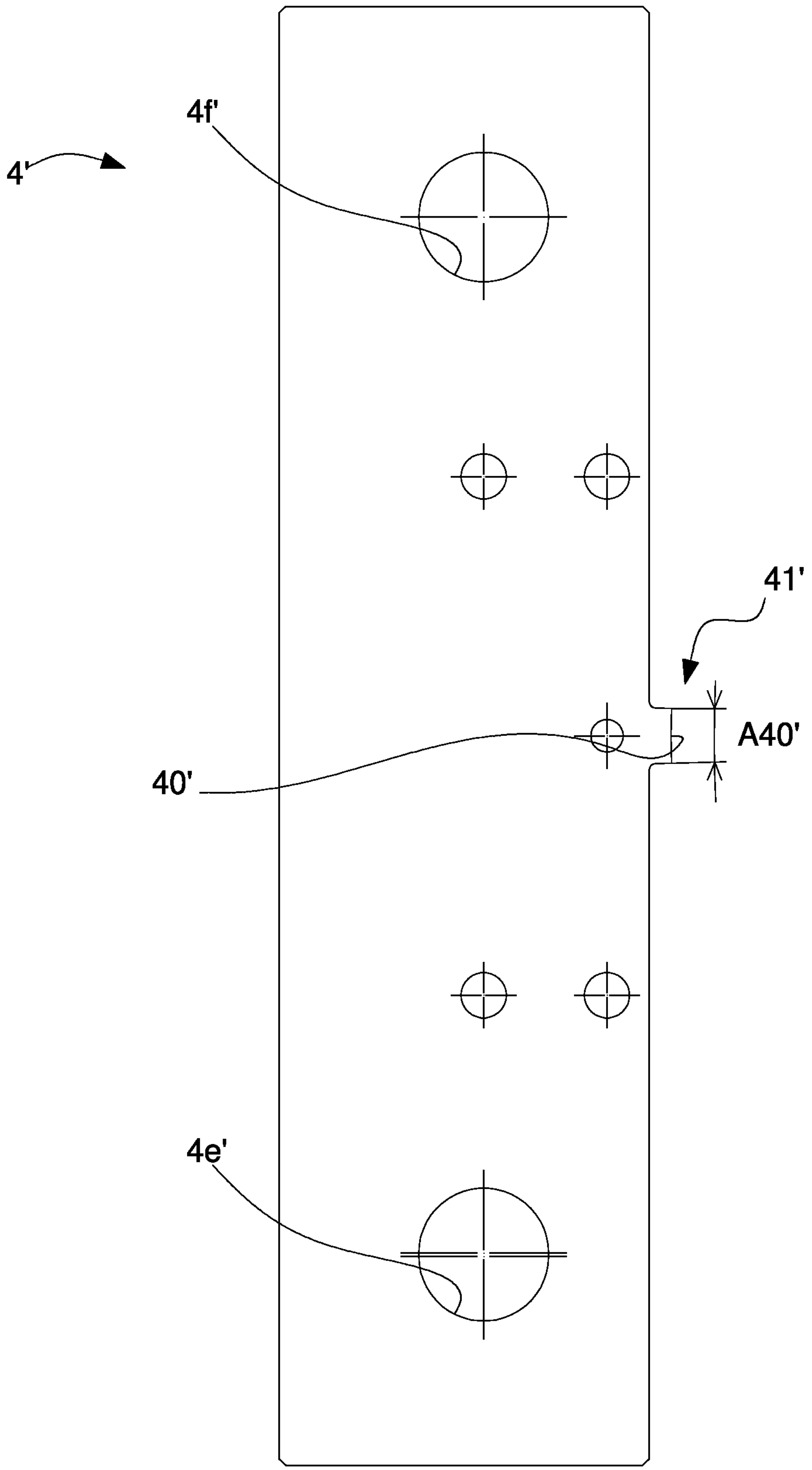
FIG. 24 is a plan view from above of the third horizontal cutting tool of FIG. 14.

Referring to FIGS. 17 and 24, the third horizontal cutting tool 4' includes a single third blade 41' provided with a cutting edge 40'.

Referring in particular to FIG. 24, the third blade 41' may extend on the third peripheral region—along the advancement direction T—over a horizontal dimension A40'. The horizontal dimension A40' of the third horizontal cutting edge 40' is substantially equal to the distance D30' between the further transverse cutting edges **30*a*', 30*b*' obtained in the further transverse cutting tool 3'**.

The third cutting edge 40' lies on a third plane parallel to the plane P. With respect to plane P, on a vertical axis Z, orthogonal to the plane P, the third plane is at the third height. The third height is at a height greater than the further first height and the further second height along the vertical axis Z. The third horizontal cutting edge 40' defines a third curved line substantially in an arc-of-circumference shape, the centre of which is located outside the knife 100' on a third axis substantially orthogonal to the plane P.

The third horizontal cutting edge 40' is arranged, in particular, at a same height of the upper ends of the transverse cutting edges **30*a*', 30*b*'**.

The third horizontal cutting tool 4' is arranged to contribute to form a horizontal section of the tab portion 79' on the side wall 70.

In an embodiment not shown, the third blade 41' may include one or more third notches arranged to form the bridges 73. The one or more third notches of the third blade 41 have a shape and function similar to that of the above-described one or more first notches 13.

In the knife 100' according to the second embodiment a further support protrusion **3*c*' obtained in the further transverse cutting tool 3' and protruding below a further lower face 3*b*' is shaped to be received in the further second recess 24', being a distance D30' between the further transverse cutting edges 30*a*', 30*b*' lower than the horizontal dimension of further second recess B24'. This allows the upper ends of the transverse cutting edges 30*a*, 30*b* to protrude beyond the further second cutting edges 20*a*', 20*b*' (or equivalently beyond the further second height) when the further second horizontal cutting tool 2' is stacked below the further transverse cutting tool 3'**.

Furthermore, in the knife 100' the further support protrusion **3*c*' is shaped to be received in a further first recess 14' obtained in the further first horizontal cutting tool 1', being the distance D30' between the further transverse cutting edges 30*a*', 30*b*' lower than the horizontal dimension of further first recess B14'**.

Figure 15:
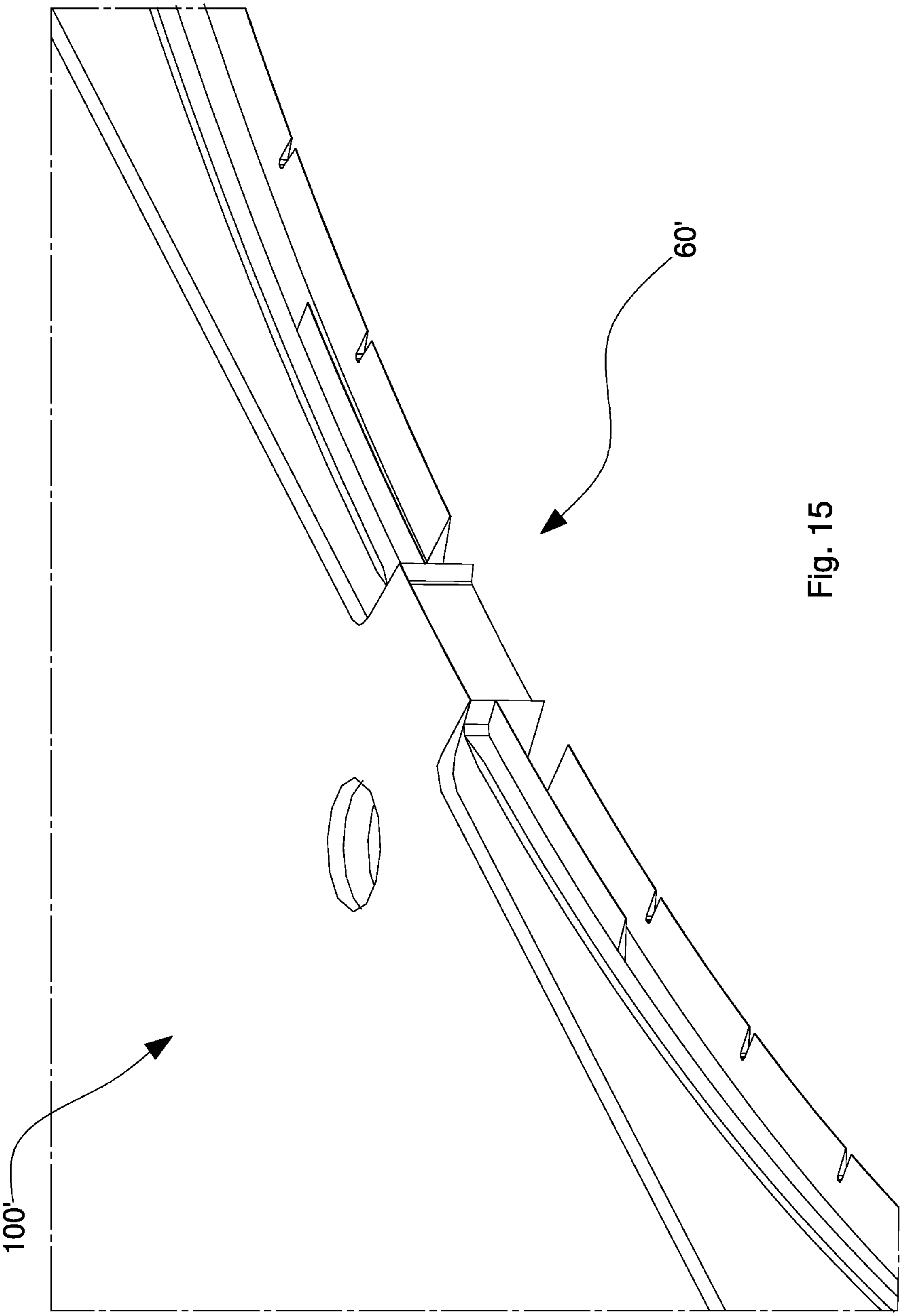
FIG. 15 is a detail of FIG. 14, showing a further arrangement of cutting edges.
Figure 16:
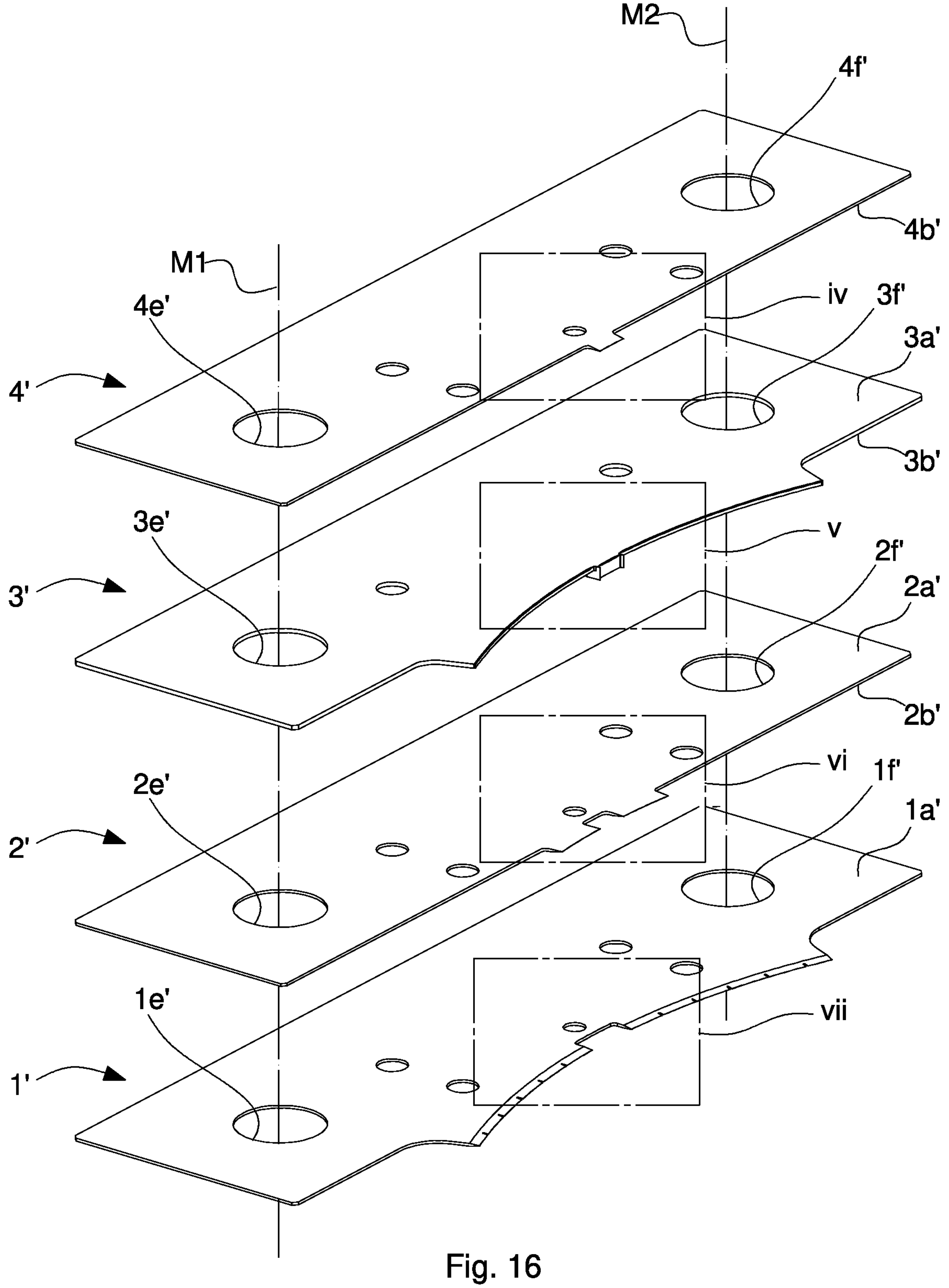
FIG. 16 is an exploded view of the knife of FIG. 14, in which a further first horizontal cutting tool, a further second horizontal cutting tool, a further transverse cutting tool and a third horizontal cutting tool are shown.

Still referring to FIGS. 14-16, an assembly configuration of the knife 100' provides interposing the further transverse cutting tool 3' between the further second horizontal cutting tool 2' and the third horizontal cutting tool 1', as described hereinafter.

In such assembly configuration of the knife 100', the third lower face **4*b*' is in contact with the further upper face 3*a*', the further lower face 3*b*' is in contact with the further second upper face 2*a*', the further second lower face 2*b*' is in contact with the further first upper face 1*a*'. Furthermore, in such an assembly configuration of the knife 100, a further first axis of a further first curve defined by the further first cutting edges 10*a*', 10*b*', the further second axis of the further second curve defined by the further second cutting edges 20*a*', 20*b*', the third axis of the third curve defined by the third cutting edge 40' and a further axis of the further curve defined by a further peripheral region 3*d*' (i.e. by a further abutment surface) obtained in the further third transverse tool 3' are substantially coincident to each other. In particular, the further first axis, the further second axis, the third axis and the further axis of the further curve defined by the further peripheral region 3*d*'** are substantially coincident with the axis of revolution of the mandrel-holder carousel.

The knife 100' is removably fixed to the frame of the cutting apparatus by means of a further fastening arrangement, not shown, such as a screw arrangement or a bolt arrangement, which further allow the cutting devices 1', 2', 3', 4' to be removably locked and fixed to each other. Referring to FIG. 16, such further fastening arrangement may be fitted along further vertical fitting axes M1', M2', i.e. substantially orthogonal to the plane P. Referring again to FIG. 16, each one of the cutting tools 1', 2', 3', 4' includes in particular, at least a further through-hole **1*e*', 2*e*', 3*e*', 4*e*', 1*f*', 2*f*', 3*f*', 4*f*' arranged to receive the further fastening arrangement so that the cutting devices 1', 2', 3', 4' may be removed from, or fitted into the layered structure, depending on a stacking order from top downwards. Referring in particular to FIGS. 21, 22, 23 and 24 the at least one further hole 1***e*', 2*e*', 3*e*', 4*e*', 1*f*', 2*f*', 3*f*', 4*f*' may include, in particular, at least a further eccentric hole, or eyelet 1*e*', 2*e*', 3*e*', 4*e*' arranged to allow adjusting the position of the cutting tools 1', 2', 3', 4' independent of each other, in particular on a plane parallel to the plane P. The at least one further hole 1*e*', 2*e*', 3*e*', 4*e*' 1*f*', 2*f*', 3*f*', 4*f*' allows, in particular, to selectively remove each of the cutting tools 1', 2', 3', 4' to allow removing and/or inserting additional cutting devices, for example to replace a cutting tool with the worn cutting edges or to change the arrangement of the cutting edges. For example, it is possible to replace only the further transverse cutting edge 3', restoring the layered structure without replacing the further first horizontal cutting tool 1' and/or the further second horizontal cutting tool 2'.

The layered structure of the knife and the corresponding assembly configuration allow to vary the arrangement of cutting edges to be cut on the caps by adding and/or replacing cutting tools in the assembly configuration. In particular, the further third transverse cutting tool 3' may be replaced with another further transverse cutting tool having increased thickness and extension of the blades to vary a height—measured along the vertical axis Z—of the tab portion 79' without replacing the further first horizontal cutting tool 1' and/or the further second horizontal cutting tool 2' and/or the third horizontal cutting tool 4'.

In such assembly configuration of the knife 100', the further arrangement of the cutting edges 60' is defined by the relative position between the further first blades 11*a*', 11*b*', the further second blades 21*a*', 21*b*', the further transverse blades 31*a*', 31*b*' and the third blade 41'.

In the knife 100' shown in FIGS. 14 to 25, the further arrangement of the cutting edges 60' lies on a single curved surface, such as on a cylindrical surface whose main axis is outside the knife 100'. In other words, in the knife 100' the further cutting edges have the same depth. The main axis of such cylindrical surface may be substantially coincident with the revolution axis of the mandrel-holder carousel.

In alternative, in a version of the knife not shown, the further cutting edges of each of the cutting tools 1', 2', 3', 4' may have different depths. In other words, the cutting edges may be arranged more or less spaced apart from the axis of the mandrel-holder carousel, for example the further transverse cutting edges 30*a*', 30*b*' may be more retracted (such as more spaced apart from the axis of the mandrel-holder carousel) with respect to the further second cutting edges 22*a*', 20*b*' and/or the further first cutting edges 10*a*', 10*b*' and/or the third cutting edge 40'.

Figure 25:
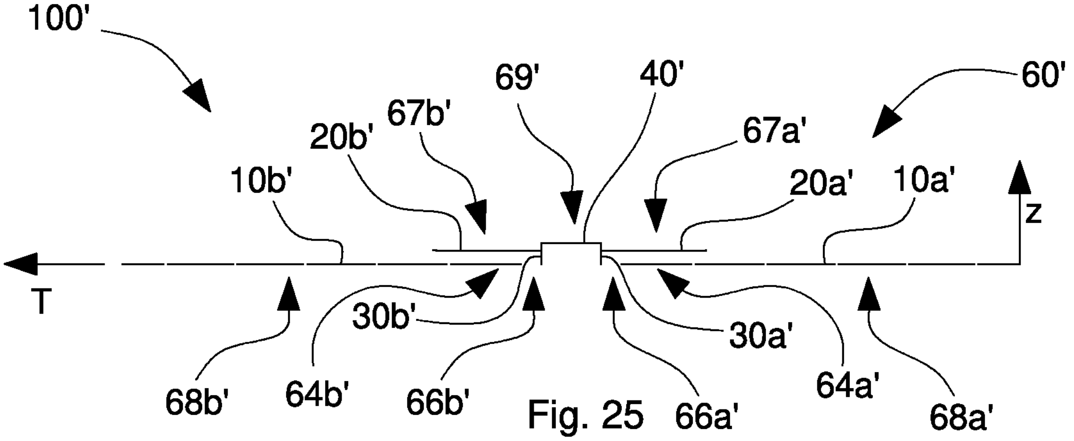
FIG. 25 is a front partial view of the knife of FIG. 14, wherein the further arrangement of cutting edges of the knife is shown.

Referring now to FIG. 25, the arrangement of the cutting edges 60' of the knife 100' is defined by the further first cutting edges 10*a*', 10*b*' lying on a further first plane parallel to the plane P, the further second cutting edges 20*a*', 20*b*' lying on a further second plane parallel to the plane P, the further transverse cutting edges 30*a*', 30*b*' arranged vertically with respect to the plane P. In an embodiment not shown the arrangement of the cutting edges 60' may include possible transverse cutting edges that are tilted with respect to the plane P.

As already mentioned above, the further first cutting edges, 10*a*', 10*b*', the further second cutting edges 20*a*', 20*b*', and the third cutting edge 40' are arranged between each other at different heights along the vertical axis Z, i.e. at different distances from the plane P.

Referring to FIGS. 26 and 27, depending on the relative position between the cutting edges of the cutting tools, the knife 100' forms on the side wall 70 of the cap 7 different parts.

The knife 100' may form on the side wall 70 in particular one or more intended detachment lines 78*a*', 78*b*', arranged on the same plane and obtained by the further first cutting edges 10*a*', 10*b*' penetrating through the thickness of the side wall 70.

The knife 100' may form on the side wall 70 in particular one or more connection portions, or straps 74*a*', 74*b*'. Each strap 74*a*', 74*b*' may in turn include in particular a central portion 77*a*', 77*b*', obtained by the penetration of the further first cutting edges 10*a*', 10*b*' and the further second cutting edges 20*a*', 20*b*'. Each strap 74*a*', 74*b*' may in turn include in particular a joint portion 76*a*', 76*b*', obtained by the penetration of the further transverse cutting edges 30*a*', 30*b*', arranged in particular to connect the connection portion 74*a*' to the main body 71.

The knife 100' may form a tab portion 79' on the side wall 70, due to the penetration of the further transverse cutting edges 30*a*', 30*b*, and of the third cutting edge 40', such tab portion 79' is arranged in particular to maintain the main body 71 overturned with respect to the tamperproof ring 72 once the container is open.

In detail, referring to FIG. 25, along the advancement direction T, the knife 100' may include in particular an opening formation part 68*a*', including the further first cutting edge 10*a*' that lies on the further first plane parallel to the plane P. The opening formation part 68*a*' extends over a horizontal direction A10*a*' that may be included between 40% and 50% of the length of the knife 100'. The opening formation part 68*a*' corresponds on the cap 7 to the relative intended detachment line 78*a*' (FIGS. 26 and 27).

The knife 100' may include in particular a connection formation part 64*a*'. The connection formation part 64*a*' occupies a region of the knife 100' extending over a horizontal dimension A20*a*' included between 5% and 30%, preferably between 18% and 25%, still more preferably between 10% and 20% of the length of the knife 100'. The connection formation part 64*a*' corresponds to the strap 74*a*' on the cap 7. In other words, the connection formation part 64*a*' is in particular arranged to make circumferential notches on the side wall 70 in order to determine, in use, a connection 74*a*', connecting the tamperproof ring 72 and the main body 71. The connection formation part 64*a*' may in turn include, in particular, a connection formation central part 67*a*', in which the further first cutting edge 10*a*' overlaps, along the vertical axis Z, to the further second cutting edge 20*a*' lying on the further second plane, i.e. at a height greater than the further first cutting edge 10*a*. The further second cutting edge 20*a*' is arranged transversally, in particular perpendicular, to the further transverse cutting edge 30*a*'. The connection formation central part 67*a*' is extended over ¾ and ⅞, preferably between ⅘ and ⁶⁄₇, still more preferably ⅚, of the connection formation part 64*a*'. The connection formation central part 67*a*' corresponds to a respective central portion of the strap 77*a*'. The connection formation part 64*a*' may in turn include in particular a joint formation part 66*a*', located in particular downstream of the connection formation central part 67*a*', including the further transverse cutting edge 30*a*'. The joint formation part 66*a*' may include in particular a final end part of the further second cutting edge 20*a*'. A final end of the further second cutting edge 20*a*' is at an intermediate part of the further transverse cutting edge 30*a*', such intermediate part is located in particular near the upper end of the further transverse cutting edge 30*a*'. The joint formation part 66*a*' is extended between ¼ and ⅛, preferably between ⅕ and ⅐, still more preferably ⅙, of the connection formation part 64*a*'. The joint formation part 66*a*' corresponds to the respective joint portion 76*a*' on the cap 7. In other words, the joint formation part 66*a*' is arranged in particular to determine in use the joint portion 76*a'*.

The knife 100' may in particular include a tab formation part 69', including the further transverse cutting edge 30*a*', the third cutting edge 40' and the further transverse cutting edge 30*b*'. An initial end of the third cutting edge 40' is substantially contiguous to an upper end of the further transverse cutting edge 30*a*' and a final end of the third cutting edge 40' is substantially contiguous to an upper end of the further transverse cutting edge 30*b*', so that the third cutting edge 40' is transverse, in particular substantially orthogonal, to the further transverse cutting edges 30*a*', 30*b*'. The intermediate portions of the further transverse cutting edges 30*a*' and 30*b*' are contiguous respectively to the final end of the further second cutting edge 20*a*' and to an initial end of the further second cutting edge 20*b*'. In other words, the tab formation part 69' includes the third horizontal cutting edge 40' parallel to the plane P and two further transverse cutting edges 30*a*' and 30*b*' substantially parallel to each other and substantially orthogonal to the plane P. The tab formation part 69' corresponds to the tab portion 79' on the side wall 70. In other words, the tab formation part 69' is arranged in particular to make notches on the side wall 70 to determine in use, the tab portion 79' on the main body 71. The tab formation part 69' extends over a horizontal dimension A40' between about 5% and 15% of the length of the knife 100'.

The knife 100' may include in particular a further connection formation part 64*b*'. The further connection formation part 64*b*' extends over a horizontal dimension A20*b*' included between 5% and 30%, preferably between 18% and 25%, still more preferably between 10% and 20%, of the length of the knife 100'. The further connection formation part 64*b*' corresponds to the strap 74*b*'. The further connection formation part 64*b*' may in turn include in particular a further connection formation central part 67*b*' in which the further first cutting edge 10*b*' overlaps along the vertical axis Z to the further second cutting edge 20*b*' lying on the further second plane, i.e. at a height greater than the further first cutting edge 10*b*'. The further connection formation central part 67*b*' is extended for example between ¾ and ⅞, preferably between ⅘ and 6/7, still more preferably ⅚, of the further connection formation part 64*b*'. The further connection formation central part 67*b*' corresponds to the relative central portion of the strap 77*b*'. The further connection formation part 64*b*' may in turn include in particular a further joint formation part 66*b*' located in particular upstream of the further connection formation central part 67*b*' including the further transverse cutting edge 30*b*'. The further joint formation part 66*b*' may include in particular the initial part of the further second cutting edge 20*b*'. The initial end of the further second cutting edge 20*b*' is contiguous to an intermediate part of the further transverse cutting edge 30*b*', in particular near the final end of the further transverse cutting edge 30*b*'. The further second cutting edge 20*b*' is arranged in particular perpendicular to the further transverse cutting edge 30*b*'. The further joint formation part 66*b*' is extended for example between ¼ and ⅛, preferably between ⅕ and ⅐, still more preferably ⅙, of the further connection formation part 64*b*'. The further joint formation part 66*b* corresponds to the respective joint portion 76*b*' on the cap 7.

The knife 100' may include in particular a further opening formation part 68*b*', including the further first cutting edge 10*b*' that lies on the further first plane parallel to the plane P. The opening formation part 68*b*' extends for example between 40 and 50% of the length of the knife 100'. The opening formation part 68*b*' corresponds on the cap 7 to the relative intended detachment line 78*b*' (FIGS. 26 and 27).

Within the framework of the invention, the terms "initial/final", and "beginning/end", "upstream/downstream" refer to the order of the projections of the ends of the cutting edges along the advancement direction T. In the specific case of transverse cutting edges or vertical cutting edges the terms "initial/final", "starts/ends", and "beginning/end", "upstream/downstream" refer to the order of the projections of the ends of the cutting edges along the vertical axis Z.

Still within the framework of the invention, the terms "upper/lower", "above/below" are meant with respect to the vertical axis Z.

It should be noted that the arrangement of the cutting edges 60, 60', since it is suitable for making notches on a substantially cylindrical-shaped object, may have a different order of the parts of the arrangement of the above-described cutting edges 60, 60 as long as the succession is fulfilled; for instance the opening formation parts 68*a*, 68*a*' and 68*c*, 68*c*' of the arrangement of the cutting edges 60, 60' may be incorporated in a single opening formation part and arranged together as initial or final part of the arrangement of cutting edges 60, 60 along the advancement direction T.

As seen, the particular geometric configuration of each cutting device provides that the blades are easily accessible, this allows to ease an operation of restoring the sharpness of the blades once that such tools are extracted from the layered structure. Such a restoring operation is increasingly eased by the fact that in the single cutting device the blade cutting edges extend evenly, for example on a single plane as in the horizontal cutting tools, or on a limited number of planes (two in the embodiments shown) that are significantly spaced apart from each other as in the transverse cutting tool.

The invention claimed is:

1. A knife arranged in a cutting apparatus for cutting incision lines and notches on a cap made of plastics intended for closing a container, said knife being suitable for making notches and incisions on a side wall of said cap when said cap, by rotating around a rotation axis thereof, is moved along a path for interacting with said knife in an advancement direction, said knife including a plurality of cutting tools arranged in a layered structure, wherein said cutting tools are parallel to a plane and stacked in a direction of a vertical axis orthogonal to said plane, said layered structure including: a first horizontal cutting tool arranged for providing circumferential notches on said side wall at a first height on said vertical axis to define a tamperproof ring and a main body in said cap; a second horizontal cutting tool arranged for providing further circumferential notches on said side wall at a second height on said vertical axis that is different from said first height; and a transverse cutting tool arranged for forming at least one notch on said side wall transverse to said plane, to define together with said second horizontal cutting tool and said first horizontal cutting tool a tab portion on said main body, said tab portion being arranged for maintaining said main body overturned with respect to said tamperproof ring once said container is opened, wherein said transverse cutting tool includes at least two transverse cutting edges arranged on a support protrusion that projects below said transverse cutting tool with respect to said vertical axis, said support protrusion being arranged in at least one first recess of said first horizontal cutting tool so that at least one lower end of said at least two transverse cutting edges is at least at a same height as at least two first horizontal cutting edges of said first horizontal cutting tool, each transverse cutting edge of said at least two transverse cutting edges, respectively, extending at an angle substantially vertical between said first height and said second height.

2. The knife according to claim 1, wherein said at least two transverse cutting edges are arranged on free ends of at least two transverse blades that protrude from a peripheral region of said transverse cutting tool, said peripheral region facing, in use, said path.

3. The knife according to claim 1, wherein said at least two first horizontal blades protrude from a first peripheral region of said first horizontal cutting tool, said first peripheral region facing, in use, said path, said at least two first horizontal blades being provided at free ends thereof with said at least two first horizontal cutting edges spaced by said at least one first recess, said at least one first recess extending on said first peripheral region along said advancement direction.

4. The knife according to claim 3, wherein said at least two transverse cutting edges are spaced apart along said advancement direction by a distance, said distance being less than a horizontal dimension of said at least one first recess.

5. The knife according to claim 1, wherein said second horizontal cutting tool is provided with at least one second horizontal blade that protrudes from a second peripheral region of said second horizontal cutting tool that in use faces said path, said at least one second horizontal blade being provided on a free end thereof with at least one second horizontal cutting edge.

6. The knife according to claim 5, wherein said second horizontal cutting tool includes at least two second horizontal blades separated by at least one second recess that extends on said second peripheral region along said advancement direction.

7. The knife according to claim 6, wherein a horizontal dimension of said at least one second recess is less than a horizontal dimension of said at least one first recess.

8. The knife according to claim 6, further including a third horizontal cutting tool arranged for making still further circumferential notches on said side wall at a third height different from said second height and from said first height to define with said second horizontal cutting tool and said transverse cutting tool said tab portion, said third horizontal cutting tool being provided with at least one third horizontal blade that protrudes from a third peripheral region of said third horizontal cutting tool, said at least one third horizontal blade being provided with at least one third horizontal cutting edge.

9. The knife according to claim 8, wherein said at least one third horizontal cutting edge is arranged at a same height as at least one upper end of at least one of said at least two transverse cutting edges.

10. The knife according to claim 8, wherein said at least one third cutting edge extends horizontally between said at least two transverse cutting edges.

11. The knife according to claim 8, wherein said transverse cutting tool is interposed between said third horizontal cutting tool and said second horizontal cutting tool.

12. The knife according to claim 1, wherein said transverse cutting tool is interposed between said first horizontal cutting tool and said second horizontal cutting tool.

13. The knife according to claim 1, wherein said angle is included between −25° and +25°.

14. The knife according to claim 1, wherein said angle is included between −15° and +15°.

15. The knife according to claim 1, wherein said angle is included between −5° and +5°.

16. A knife arranged in a cutting apparatus for cutting incision lines and notches on a cap made of plastics intended for closing a container, said knife being suitable for making notches and incisions on a side wall of said cap when said cap, by rotating around a rotation axis thereof, is moved along a path for interacting with said knife in an advancement direction, said knife including a plurality of cutting tools arranged in a layered structure, wherein said cutting tools are parallel to a plane and stacked in a direction of a vertical axis orthogonal to said plane, said layered structure including: a first horizontal cutting tool arranged for providing circumferential notches on said side wall at a first height on said vertical axis to define a tamperproof ring and a main body in said cap; a second horizontal cutting tool including at least two second horizontal blades separated by at least one second recess that extends on said second peripheral region along said advancement direction, said second cutting tool providing further circumferential notches on said side wall at a second height on said vertical axis that is different from said first height; and a transverse cutting tool arranged for forming at least one notch on said side wall transverse to said plane, to define together with said second horizontal cutting tool and said first horizontal cutting tool a tab portion on said main body, said tab portion being arranged for maintaining said main body overturned with respect to said tamperproof ring once said container is opened, wherein said transverse cutting tool includes at least two transverse cutting edges arranged on a support protrusion that projects below said transverse cutting tool with respect to said vertical axis, said support protrusion being arranged in said at least one second recess, said second horizontal cutting tool being arranged below said transverse cutting tool in said layered structure, so that at least one upper end of said at least two transverse cutting edges can protrude above and beyond said at least two second horizontal cutting edges, each transverse cutting edge of said at least two transverse cutting edges, respectively, extending at an angle substantially vertical between said first height and said second height.

17. The knife according to claim 16, wherein said angle is included between −25° and +25°.

18. The knife according to claim 16, wherein said angle is included between −15° and +15°.

19. The knife according to claim 16, wherein said angle is included between −5° and +5°.

* * * * *